（12）United States Patent
Lalonde et al.

(10) Patent No.: US 11,760,029 B2
(45) Date of Patent: Sep. 19, 2023

(54) SYSTEMS AND METHODS FOR CONTROLLING ADDITIVE MANUFACTURING

(71) Applicant: Continuous Composites Inc., Coeur d'Alene, ID (US)

(72) Inventors: Logan Lalonde, Coeur d'Alene, ID (US); Brock Adam Jahner, Coeur d'Alene, ID (US); Mikel Negugogor, Coeur d'Alene, ID (US); Rachael Kathleen Morris, Greenacres, WA (US)

(73) Assignee: Continuous Composites Inc., Coeur d'Alene, ID (US)

( * ) Notice: Subject to any disclaimer, the term of this patent is extended or adjusted under 35 U.S.C. 154(b) by 0 days.

(21) Appl. No.: 17/304,032

(22) Filed: Jun. 14, 2021

(65) Prior Publication Data

US 2021/0394452 A1  Dec. 23, 2021

Related U.S. Application Data

(60) Provisional application No. 63/042,851, filed on Jun. 23, 2020.

(51) Int. Cl.
  *B29C 64/393* (2017.01)
  *B29C 64/118* (2017.01)
  (Continued)

(52) U.S. Cl.
  CPC .......... *B29C 64/393* (2017.08); *B29C 64/118* (2017.08); *B29C 64/188* (2017.08);
  (Continued)

(58) Field of Classification Search
  None
  See application file for complete search history.

(56) References Cited

U.S. PATENT DOCUMENTS

| 1,986,974 | A | 1/1935 | Kellogg |
| 3,286,305 | A | 11/1966 | Seckel |

(Continued)

FOREIGN PATENT DOCUMENTS

| CN | 111954595 A | * 11/2020 |
| DE | 4102257 A1 | 7/1992 |

(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journal of Materials Science, vol. 44, pp. 4188-4190 (Apr. 2009).

(Continued)

*Primary Examiner* — Yung-Sheng M Tsui
(74) *Attorney, Agent, or Firm* — Ryan Stockett

(57) ABSTRACT

A method is disclosed for additively manufacturing a structure. The method may include generating a vector field through a 3D virtual model, and slicing the virtual model into a plurality of layers that are aligned with the vector field. The method may also include generating at least one tool path for at least one of the plurality of layers, and causing an additive manufacturing machine to deposit a material along the at least one tool path.

17 Claims, 18 Drawing Sheets

(51) Int. Cl.
    *B29C 64/209*     (2017.01)
    *B33Y 50/02*     (2015.01)
    *G06F 30/10*     (2020.01)
    *G06F 30/23*     (2020.01)
    *B33Y 10/00*     (2015.01)
    *B33Y 30/00*     (2015.01)
    *B29C 64/188*     (2017.01)
    *B29C 64/227*     (2017.01)
    *G05B 19/4099*     (2006.01)
    *G06F 113/10*     (2020.01)
    *B29K 105/08*     (2006.01)

(52) U.S. Cl.
    CPC .......... *B29C 64/209* (2017.08); *B29C 64/227* (2017.08); *B33Y 10/00* (2014.12); *B33Y 30/00* (2014.12); *B33Y 50/02* (2014.12); *G05B 19/4099* (2013.01); *G06F 30/10* (2020.01); *G06F 30/23* (2020.01); *B29C 2793/0027* (2013.01); *B29K 2105/08* (2013.01); *G05B 2219/35134* (2013.01); *G05B 2219/49007* (2013.01); *G06F 2113/10* (2020.01)

(56) References Cited

U.S. PATENT DOCUMENTS

| | | |
|---|---|---|
| 3,474,615 A | 10/1969 | Irwin et al. |
| 3,634,972 A | 1/1972 | Ilman |
| 3,643,417 A | 2/1972 | Irwin |
| 3,809,514 A | 5/1974 | Nunez |
| 3,867,810 A | 2/1975 | Meertens et al. |
| 3,904,458 A | 9/1975 | Wray |
| 3,984,271 A | 10/1976 | Gilbu |
| 3,993,726 A | 11/1976 | Moyer |
| 4,089,727 A | 5/1978 | McLain |
| 4,201,618 A | 5/1980 | Lewis |
| 4,373,412 A | 2/1983 | Gerber et al. |
| 4,428,992 A | 1/1984 | Street |
| 4,500,372 A | 2/1985 | Mion |
| 4,523,600 A | 6/1985 | Donovan |
| 4,571,929 A | 2/1986 | Bertrams |
| 4,573,313 A | 3/1986 | Bertrams |
| 4,577,458 A | 3/1986 | Garnsworthy |
| 4,608,816 A | 9/1986 | Bertrams et al. |
| 4,643,940 A | 2/1987 | Shaw et al. |
| 4,671,761 A | 6/1987 | Adrian et al. |
| 4,757,676 A | 7/1988 | Clayton |
| 4,822,548 A | 4/1989 | Hempel |
| 4,825,630 A | 5/1989 | Czelusniak et al. |
| 4,833,872 A | 5/1989 | Czelusniak et al. |
| 4,851,065 A | 7/1989 | Curtz |
| 4,947,635 A | 8/1990 | Speranzin et al. |
| 4,954,152 A | 9/1990 | Hsu et al. |
| 4,987,808 A | 1/1991 | Sicka et al. |
| 5,002,712 A | 3/1991 | Goldmann et al. |
| 5,037,691 A | 8/1991 | Medney et al. |
| 5,042,902 A | 8/1991 | Huebscher et al. |
| 5,121,329 A | 6/1992 | Crump |
| 5,167,111 A | 12/1992 | Cottenceau et al. |
| 5,296,335 A | 3/1994 | Thomas et al. |
| 5,340,433 A | 8/1994 | Crump |
| 5,354,414 A | 10/1994 | Feygin |
| 5,746,967 A | 5/1998 | Hoy et al. |
| 5,866,058 A | 2/1999 | Batchelder et al. |
| 5,936,861 A | 8/1999 | Jang et al. |
| 6,153,034 A | 11/2000 | Lipsker |
| 6,214,279 B1 | 4/2001 | Yang et al. |
| 6,459,069 B1 | 10/2002 | Rabinovich |
| 6,501,554 B1 | 12/2002 | Hackney et al. |
| 6,799,081 B1 | 9/2004 | Hale et al. |
| 6,803,003 B2 | 10/2004 | Rigali et al. |
| 6,934,600 B2 | 8/2005 | Jang et al. |
| 7,039,485 B2 | 5/2006 | Engelbart et al. |
| 7,555,404 B2 | 6/2009 | Brennan et al. |
| 7,795,349 B2 | 9/2010 | Bredt et al. |
| 8,221,669 B2 | 7/2012 | Batchelder et al. |
| 8,851,609 B2 | 10/2014 | Saita |
| 8,962,717 B2 | 2/2015 | Roth et al. |
| 9,126,365 B1 | 9/2015 | Mark et al. |
| 9,126,367 B1 | 9/2015 | Mark et al. |
| 9,149,988 B2 | 10/2015 | Mark et al. |
| 9,156,205 B2 | 10/2015 | Mark et al. |
| 9,186,846 B1 | 11/2015 | Mark et al. |
| 9,186,848 B2 | 11/2015 | Mark et al. |
| 9,327,452 B2 | 5/2016 | Mark et al. |
| 9,327,453 B2 | 5/2016 | Mark et al. |
| 9,370,896 B2 | 6/2016 | Mark |
| 9,381,702 B2 | 7/2016 | Hollander |
| 9,457,521 B2 | 10/2016 | Johnston et al. |
| 9,458,955 B2 | 10/2016 | Hammer et al. |
| 9,527,248 B2 | 12/2016 | Hollander |
| 9,539,762 B2 | 1/2017 | Durand et al. |
| 9,579,851 B2 | 2/2017 | Mark et al. |
| 9,688,028 B2 | 6/2017 | Mark et al. |
| 9,694,544 B2 | 7/2017 | Mark et al. |
| 9,764,378 B2 | 9/2017 | Peters et al. |
| 9,770,876 B2 | 9/2017 | Farmer et al. |
| 9,782,926 B2 | 10/2017 | Witzel et al. |
| 10,489,525 B2 * | 11/2019 | Joshi ................. G06F 30/23 |
| 11,042,671 B1 * | 6/2021 | Sims ................. G06F 30/12 |
| 11,058,514 B2 * | 7/2021 | Chen ................ A61C 13/0004 |
| 2002/0009935 A1 | 1/2002 | Hsiao et al. |
| 2002/0062909 A1 | 5/2002 | Jang et al. |
| 2002/0113331 A1 | 8/2002 | Zhang et al. |
| 2002/0165304 A1 | 11/2002 | Mulligan et al. |
| 2003/0044539 A1 | 3/2003 | Oswald |
| 2003/0056870 A1 | 3/2003 | Comb et al. |
| 2003/0160970 A1 | 8/2003 | Basu et al. |
| 2003/0186042 A1 | 10/2003 | Dunlap et al. |
| 2003/0236588 A1 | 12/2003 | Jang et al. |
| 2004/0254633 A1 | 12/2004 | Rapaport et al. |
| 2005/0006803 A1 | 1/2005 | Owens |
| 2005/0061422 A1 | 3/2005 | Martin |
| 2005/0065400 A1 | 3/2005 | Banik et al. |
| 2005/0104257 A1 | 5/2005 | Gu et al. |
| 2005/0109451 A1 | 5/2005 | Hauber et al. |
| 2005/0230029 A1 | 10/2005 | Vaidyanathan et al. |
| 2006/0118198 A1 | 6/2006 | Eisenhut |
| 2007/0003650 A1 | 1/2007 | Schroeder |
| 2007/0228592 A1 | 10/2007 | Dunn et al. |
| 2008/0176092 A1 | 7/2008 | Owens |
| 2009/0095410 A1 | 4/2009 | Oldani |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0241114 A1 | 9/2013 | Ravich et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1 | 3/2014 | Tyler |
| 2014/0159284 A1 | 6/2014 | Leavitt |
| 2014/0170012 A1 | 6/2014 | Delisle et al. |
| 2014/0232035 A1 | 8/2014 | Bheda |
| 2014/0242208 A1 | 8/2014 | Elsworthy |
| 2014/0268604 A1 | 9/2014 | Wicker et al. |
| 2014/0291886 A1 | 10/2014 | Mark et al. |
| 2014/0361460 A1 | 12/2014 | Mark |
| 2015/0005919 A1 | 1/2015 | McGatha et al. |
| 2015/0174824 A1 | 1/2015 | Lee et al. |
| 2015/0136455 A1 | 5/2015 | Fleming |
| 2015/0165691 A1 | 6/2015 | Mark et al. |
| 2015/0201500 A1 | 7/2015 | Shinar et al. |
| 2015/0217517 A1 | 8/2015 | Karpas et al. |
| 2015/0321419 A1 | 11/2015 | Linthicum et al. |
| 2015/0321441 A1 | 11/2015 | Marcoe et al. |
| 2015/0343673 A1 | 12/2015 | Williams |

(56) References Cited

U.S. PATENT DOCUMENTS

| | | |
|---|---|---|
| 2016/0009029 A1 | 1/2016 | Cohen et al. |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0136887 A1 | 5/2016 | Guillemette et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271876 A1 | 9/2016 | Lower |
| 2016/0288420 A1 | 10/2016 | Anderson et al. |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361869 A1 | 12/2016 | Mark et al. |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda et al. |
| 2017/0106565 A1 | 4/2017 | Braley et al. |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2018/0065308 A1 | 3/2018 | Stockett et al. |
| 2018/0104912 A1 | 4/2018 | Bastian et al. |
| 2018/0229446 A1 | 8/2018 | Bastian et al. |
| 2018/0253078 A1 * | 9/2018 | Sennoun ............ G05B 19/4099 |
| 2019/0197210 A1 * | 6/2019 | Bonner ................ B29C 64/386 |
| 2019/0210288 A1 * | 7/2019 | Elber ...................... G06T 17/05 |
| 2020/0023573 A1 | 1/2020 | Nandu |
| 2020/0050119 A1 * | 2/2020 | Shores .................... B22F 10/12 |
| 2020/0142384 A1 * | 5/2020 | Bressler ................. B33Y 50/00 |
| 2020/0156323 A1 | 5/2020 | Woytowitz et al. |
| 2021/0020263 A1 * | 1/2021 | Pasini ...................... B82B 1/002 |
| 2021/0034036 A1 * | 2/2021 | Nomura ............... B29C 70/382 |
| 2021/0046710 A1 * | 2/2021 | Koopmans ........... B29C 64/106 |
| 2021/0141314 A1 * | 5/2021 | Shores .................... B33Y 10/00 |
| 2021/0205099 A1 * | 7/2021 | Parr ........................ B33Y 50/02 |
| 2022/0143917 A1 * | 5/2022 | Kabaria ................. B33Y 10/00 |

FOREIGN PATENT DOCUMENTS

| | | |
|---|---|---|
| EP | 0063954 A1 | 11/1982 |
| EP | 1932636 A1 | 6/2008 |
| EP | 2589481 B1 | 1/2016 |
| EP | 3219474 A1 | 9/2017 |
| EP | 3592561 B1 * | 4/2021 |
| EP | 3170648 B1 * | 5/2021 |
| JP | 2016117273 A * | 6/2016 |
| KR | 100995983 B1 | 11/2010 |
| KR | 101172859 B1 | 8/2012 |
| WO | WO-2012119144 A1 * | 9/2012 |
| WO | 2013017284 A2 | 2/2013 |
| WO | WO-2013155500 A1 * | 10/2013 |
| WO | 2016011252 A1 | 1/2016 |
| WO | 2016088042 A1 | 6/2016 |
| WO | 2016088048 A1 | 6/2016 |
| WO | 2016110444 A1 | 7/2016 |
| WO | WO-2016113955 A1 * | 7/2016 |
| WO | 2016125138 A2 | 8/2016 |
| WO | WO-2016122625 A1 * | 8/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |
| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

(56) References Cited

FOREIGN PATENT DOCUMENTS

| WO | WO-2018207242 A1 | * | 11/2018 |
| WO | WO-2019245529 A1 | * | 12/2019 |
| WO | WO-2020223291 A1 | * | 11/2020 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

International Search Report dated Dec. 27, 2017 for PCT/US2017/047493 to CC3D LLC Filed Aug. 18, 2017.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J. Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.- P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Website-Markforged Installing Fiber Spool Tensioner.

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

International Search Report dated Jul. 10, 2021 for PCT/US2021/070725 for Continuous Composites Inc. filed on June Jun. 17, 2021.

* cited by examiner

SYSTEMS AND METHODS FOR CONTROLLING ADDITIVE MANUFACTURING

RELATED APPLICATION

This application is based on and claims the benefit of priority from U.S. Provisional Application No. 63/042,851 that was filed on Jun. 23, 2020, the contents of which are expressly incorporated herein by reference.

TECHNICAL FIELD

The present disclosure relates generally to manufacturing control systems and, more particularly, to systems and methods for controlling additive manufacturing.

BACKGROUND

Traditional additive manufacturing is a process of creating three-dimensional parts by depositing overlapping layers of material under the guided control of a computer. A common form of additive manufacturing is known as fused deposition modeling (FDM). Using FDM, a thermoplastic is passed through and liquified within a heated print head. The print head is moved in a predefined trajectory (a.k.a., a tool path) as the material discharges from the print head, such that the material is laid down in a particular pattern and shape of overlapping 2-dimensional layers. The material, after exiting the print head, cools and hardens into a final form. A strength of the final form is primarily due to properties of the particular thermoplastic supplied to the print head and a 3-dimensional shape formed by the stack of 2-dimensional layers.

A recently developed improvement over traditional FDM manufacturing involves the use of continuous fibers embedded within material discharging from the print head. For example, a matrix can be supplied to the print head and discharged (e.g., extruded and/or pultruded) along with one or more continuous fibers also passing through the same print head at the same time. The matrix can be a traditional thermoplastic, a powdered metal, a liquid matrix (e.g., a UV curable and/or two-part resin), or a combination of any of these and other known matrixes. Upon exiting the print head, a cure enhancer (e.g., a UV light, a laser, an ultrasonic emitter, a heat source, a catalyst supply, etc.) is activated to initiate and/or complete curing (e.g., hardening, cross-linking, sintering, etc.) of the matrix. This curing, when completed quickly enough, can allow for unsupported structures to be fabricated in free space. And when fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

The disclosed systems and methods are directed to addressing ways of controlling additive manufacturing systems similar to those disclosed in the '543 patent and/or other systems known in the art.

SUMMARY

In one aspect, the present disclosure is directed to a method for additively manufacturing a structure. The method may include generating a vector field through a 3D virtual model, and slicing the virtual model into a plurality of layers that are aligned with the vector field. The method may also include generating at least one tool path for at least one of the plurality of layers, and causing an additive manufacturing machine to deposit a material along the at least one tool path.

In another aspect, the present disclosure is directed to another method for additively manufacturing a composite structure. This method may include generating a mesh of a 3D virtual model, and analyzing the mesh based on an isotropic property of a material to be used in manufacturing the structure and intended loading to generate a vector field through the 3D virtual model. The method may also include slicing the virtual model into a plurality of layers that are aligned with the vector field and applying at least one infill pattern to the at least one of the plurality of layers. The method may further include performing an analysis of the at least one of the plurality of layers based on the at least one infill pattern and an anisotropic property of the material, and adjusting the at least one infill pattern based on the analysis. The method may additionally include generating at least one tool path to pass through sequential points of the at least one infill pattern after the adjusting, and causing an additive manufacturing machine to deposit the material along the at least one tool path.

In yet another aspect, the present disclosure is directed to an additive manufacturing system. The system may include an additive manufacturing machine configured to discharge a composite material including a continuous reinforcement and a matrix, and a control system configured to cause the additive manufacturing machine to deposit the composite material along a tool path to form a structure. The control system may include a processor programmed to generate a vector field through a 3D virtual model of the structure, to slice the 3D virtual model into a plurality of layers that are aligned with the vector field, and to generate the at least one tool path for at least one of the plurality of layers.

DETAILED DESCRIPTION

Figure 1:
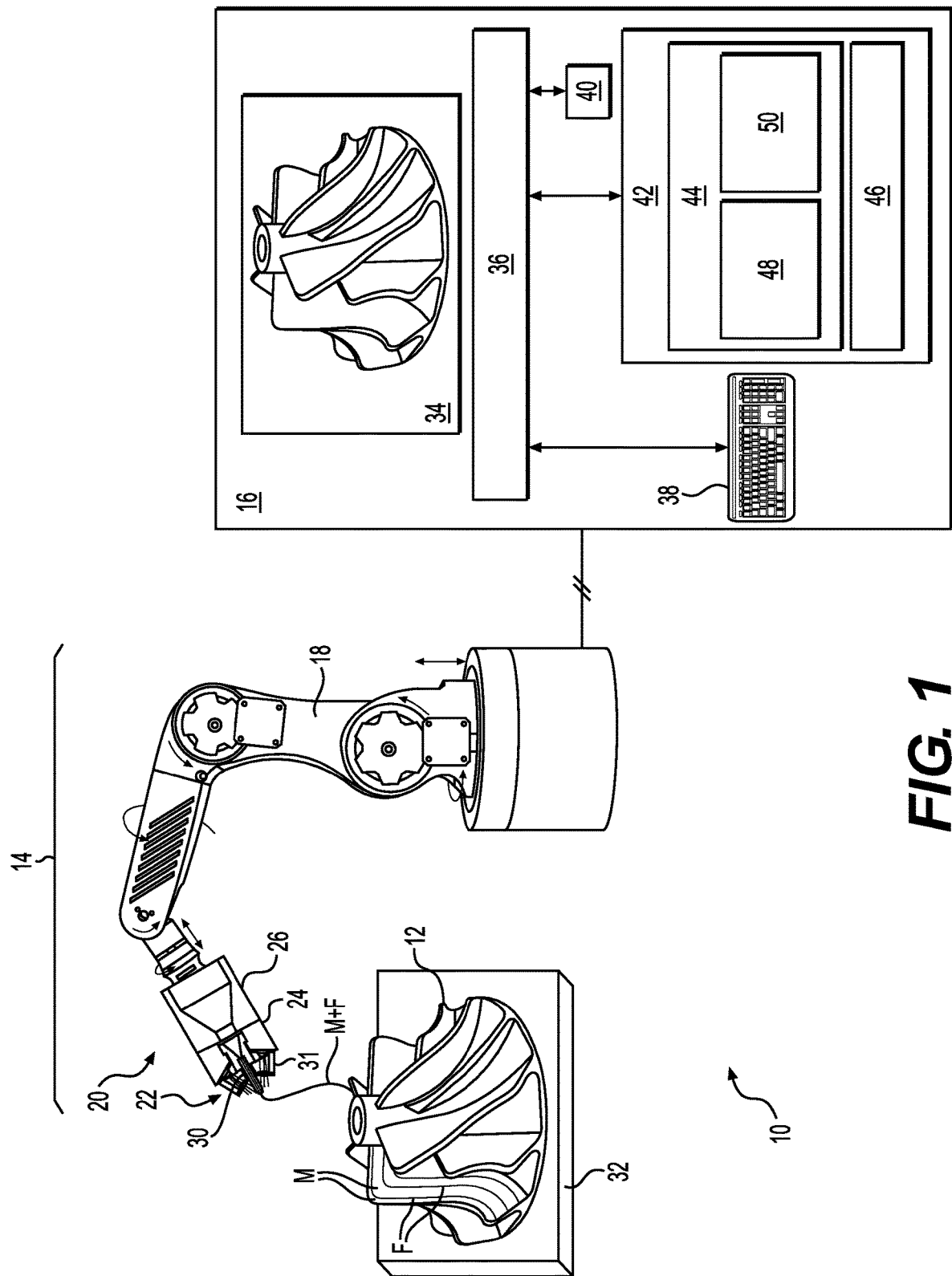
FIG. 1 is a diagrammatic illustration of an exemplary disclosed additive manufacturing machine and a corresponding control system that may be used to control the machine.

FIG. 1 illustrates an exemplary control system ("system") 10, which may be used to design, plan, fabricate, and/or analyze a structure 12 having any desired shape, size, consist, and functionality. System 10 may include, among other things, an additive manufacturing machine ("machine") 14 and at least one computing device 16 operatively connected to machine 14. Machine 14 may be configured to create structure 12 under the guided control of computing device 16, for example by way of an additive manufacturing process. Although additive manufacturing processes utilizing one or more continuous reinforcements (e.g., fibers—F) and one or more curable matrixes (M) will be described below as examples of how structure 12 may be created, it should be noted that other processes known in the art could alternatively be utilized for this purpose and benefit from the disclosed control systems and methods.

Machine 14 may be comprised of components that are controllable to create structure 12, layer-by-layer and/or in free space (e.g., without the bracing of an underlying layer). These components may include, among other things, a support 18 and any number of heads 20 coupled to and/or powered by support 18. In the disclosed embodiment of FIG. 1, support 18 is a robotic arm capable of moving head 20 in multiple directions during fabrication of structure 12. It should be noted that any other type of support (e.g., a gantry, an arm/gantry combination, etc.) capable of moving head 20 in the same or in a different manner could also be utilized, if desired.

Each head 20 (only one shown in FIG. 1, for clarity) may be configured to discharge at least a matrix (e.g., a liquid resin, such as a zero volatile organic compound resin; a powdered metal; etc.) that is curable. Exemplary curable matrixes include a thermoset polymer, single- or multi-part epoxy resins, polyester resins, cationic epoxies, acrylated epoxies, urethanes, esters, a thermoplastic polymer, photopolymers, polyepoxides, thiols, alkenes, thiol-enes, and more. In one embodiment, the matrix inside each head 20 may be pressurized, for example by an external device (e.g., an extruder or another type of pump—not shown) that is fluidly connected to head 20 via a corresponding conduit (not shown). In another embodiment, however, the pressure may be generated completely inside of head 20 by a similar type of device. In yet other embodiments, the matrix may be gravity-fed through and/or mixed within head 20. In some instances, the matrix inside head 20 may need to be kept cool and/or dark to inhibit premature curing; while in other instances, the matrix may need to be kept warm and/or light for the same reason. In either situation, head 20 may be specially configured (e.g., insulated, temperature controlled, shielded, etc.) to provide for these needs.

In some embodiments, the matrix may be mixed with, contain, or otherwise at least partially wet or coat one or more fibers (e.g., individual fibers, tows, rovings, sleeves, ribbons, and/or sheets of material) and, together with the fibers, make up at least a portion (e.g., a wall) of structure 12. The fibers may be stored within (e.g., on one or more separate internal spools—not shown) or otherwise passed through head 20 (e.g., fed from one or more external spools). When multiple fibers are simultaneously used, the fibers may be of the same type and have the same diameter, cross-sectional shape (e.g., circular, rectangular, triangular, etc.), and sizing, or of a different type with different diameters, cross-sectional shapes, and/or sizing. The fibers may include, for example, aramid fibers, carbon fibers, vegetable fibers, wood fibers, mineral fibers, glass fibers, metallic wires, optical tubes, etc. It should be noted that the term "fiber" is meant to encompass both structural and non-structural (e.g., functional) types of continuous reinforcements that can be at least partially encased in the matrix discharging from head 20.

The fibers may be exposed to (e.g., at least partially wetted, coated with, and/or fully saturated in) the matrix while the fibers are inside head 20, while the fibers are being passed to head 20, and/or while the fibers are discharging from head 20, as desired. The matrix, dry fibers, and/or fibers that are already exposed to the matrix (e.g., wetted fibers) may be transported into head 20 in any manner apparent to one skilled in the art.

Support 18 may move head 20 in a particular trajectory (e.g., a trajectory corresponding to an intended shape, size, and/or function of structure 12) at the same time that the matrix-wetted fiber(s) discharge from head 20, such that one or more continuous paths of matrix-wetted fiber(s) are formed along the trajectory. Each path may have any cross-sectional shape, diameter, and/or fiber-to-matrix ratio, and the fibers may be radially dispersed with the matrix, located at a general center thereof, or located only at a periphery.

One or more cure enhancers (e.g., a UV light, a laser, an ultrasonic emitter, a heater, a catalyst dispenser, etc.) 22 may be mounted proximate (e.g., within or on) head 20 and configured to enhance a cure rate and/or quality of the matrix as it is discharged from head 20. Cure enhancer 22 may be regulated to selectively expose surfaces of structure 12 to a desired type and/or intensity of energy (e.g., to UV light, electromagnetic radiation, vibrations, heat, a chemical catalyst or hardener, etc.) during the formation of structure 12. The energy may increase a rate of chemical reaction occurring within the matrix, sinter the matrix, harden the matrix, or otherwise cause the matrix to cure as it discharges from head 20. In the depicted embodiments, cure enhancer 22 includes multiple LEDs that are equally distributed about a center axis of head 20. However, it is contemplated that any number of LEDs and/or other energy sources could alternatively be utilized for the disclosed purposes and/or arranged in another manner (e.g., unequally distributed, arranged in a row, only leading, only trailing, etc.). For example, cure enhancers 22 could be located on an arm (not shown) that trails behind head 20 and/or on a portion of support 18, if desired. The amount of energy produced by cure enhancer(s) 22 may be sufficient to at least partially cure an exposes surface of the matrix before structure 12 axially grows more than a predetermined length away from head 20. In one embodiment, structure 12 is completely cured before the axial growth length becomes equal to an external diameter of the matrix-coated reinforcement.

In the embodiment of FIG. 1, head 20 is modular. For example, head 20 may include a matrix reservoir 26 and an outlet 24 that is removably connected to matrix reservoir 26 (e.g., via one or more threaded fasteners, clasps, actuators, and/or other hardware—not shown). In this example, outlet 24 is a single-track outlet configured to discharge composite material having a generally circular, rectangular, triangular, and/or other polygonal cross-section. The configuration of head 20, however, may allow outlet 24 to be swapped out for another outlet that discharges composite material having a different shape (e.g., a tubular cross-section, a ribbon or sheet cross-section, etc.) and/or a different number of tracks.

In some embodiments, cure enhancer(s) 22 may be mounted to a lower portion (e.g., a portion distal from matrix reservoir 26) of outlet 24. With this configuration, cure enhancer(s) 22 may be located around a distal end in a configuration that best suits the shape, size, and/or type of material discharging from outlet 24. In the disclosed embodiment, cure enhancer(s) 22 are mounted at an angle relative to a central axis of outlet 24, such that energy from cure enhancer(s) 22 is directed centrally toward the material discharging from outlet 24. One or more optics 31 may be used in some applications, to selectively block, disperse, focus, and/or aim the energy from cure enhancers 22 at an opening of outlet 24. This may affect a cure rate of and/or cure location on the material discharging from outlet 24. It is contemplated that optics 31 may be adjustable, if desired (e.g., manually adjustable via a set screw—not shown, or automatically adjustable via an actuator—not shown).

The matrix and/or reinforcement may be discharged together from head 20 via any number of different modes of operation. In a first example mode of operation, the matrix and/or reinforcement are extruded (e.g., pushed under pressure and/or mechanical force) from head 20 as head 20 is moved by support 18 to create features of structure 12. In a second example mode of operation, at least the reinforcement is pulled from head 20, such that a tensile stress is created in the reinforcement during discharge. In this second mode of operation, the matrix may cling to the reinforcement and thereby also be pulled from head 20 along with the reinforcement, and/or the matrix may be discharged from head 20 under pressure along with the pulled reinforcement. In the second mode of operation, where the reinforcement is being pulled from head 20, the resulting tension in the reinforcement may increase a strength of structure 12 (e.g., by aligning the reinforcements, inhibiting buckling, equally loading the reinforcements, etc.) after curing of the matrix, while also allowing for a greater length of unsupported structure 12 to have a straighter trajectory. That is, the tension in the reinforcement remaining after curing of the matrix may act against the force of gravity (e.g., directly and/or indirectly by creating moments that oppose gravity) to provide support for structure 12.

The reinforcement may be pulled from head 20 as a result of head 20 being moved and/or tilted by support 18 away from an anchor point (e.g., a print bed, an existing surface of structure 12, a fixture, etc.) 32. For example, at the start of structure formation, a length of matrix-impregnated reinforcement may be pulled and/or pushed from head 20, deposited against anchor point 32, and at least partially cured, such that the discharged material adheres (or is otherwise coupled) to the anchor point. Thereafter, head 20 may be moved and/or tilted away from anchor point 32, and the relative motion may cause the reinforcement to be pulled from head 20. As will be explained in more detail below, the movement of reinforcement through head 20 may be selectively assisted via one or more internal feed mechanisms, if desired. However, the discharge rate of reinforcement from head 20 may primarily be the result of relative movement between head 20 and anchor point 32, such that tension is created within the reinforcement. As discussed above, anchor point 32 could be moved away from head 20 instead of or in addition to head 20 being moved away from anchor point 32.

Any number of separate computing devices 16 may be used to design and/or control the placement of fibers within structure 12 and/or to analyze performance characteristics of structure 12 before, during, and/or after formation. Computing device 16 may include, among other things, a display 34, one or more processors 36, any number of input/output ("I/O") devices 38, any number of peripherals 40, and one or more memories 42 for storing programs 44 and data 46. Programs 44 may include, for example, any number of design and/or printing apps 48 and an operating system 50.

Display 34 of computing device 16 may include a liquid crystal display (LCD), a light emitting diode (LED) screen, an organic light emitting diode (OLED) screen, and/or another known display device. Display 34 may be used for presentation of data under the control of processor 36.

Processor 36 may be a single or multi-core processor configured with virtual processing technologies, and use logic to simultaneously execute and control any number of operations. Processor 36 may be configured to implement virtual machine or other known technologies to execute, control, run, manipulate, and store any number of software modules, applications, programs, etc. In addition, in some embodiments, processor 36 may include one or more specialized hardware, software, and/or firmware modules (not shown) specially configured with particular circuitry, instructions, algorithms, and/or data to perform functions of the disclosed methods. It is appreciated that other types of processor arrangements could be implemented that provide for the capabilities disclosed herein.

Memory 42 can be a volatile or non-volatile, magnetic, semiconductor, tape, optical, removable, non-removable, or other type of storage device or tangible and/or non-transitory computer-readable medium that stores one or more executable programs 44, such as analysis and/or printing apps 48 and operating system 50. Common forms of non-transitory media include, for example, a flash drive, a flexible disk, a hard disk, a solid state drive, magnetic tape or other magnetic data storage medium, a CD-ROM or other optical data storage medium, any physical medium with patterns of holes, a RAM, a PROM, an EPROM, a FLASH-EPROM or other flash memory, NVRAM, a cache, a register or other memory chip or cartridge, and networked versions of the same.

Memory 42 may store instructions that enable processor 36 to execute one or more applications, such as design and/or fabrication apps 48, operating system 50, and any other type of application or software known to be available on computer systems. Alternatively or additionally, the instructions, application programs, etc. can be stored in an internal and/or external database (e.g., a cloud storage system—not shown) that is in direct communication with computing device 16, such as one or more databases or memories accessible via one or more networks (not shown). Memory 42 can include one or more memory devices that store data and instructions used to perform one or more features of the disclosed embodiments. Memory 42 can also include any combination of one or more databases controlled by memory controller devices (e.g., servers, etc.) or software, such as document management systems, Microsoft SQL databases, SharePoint databases, Oracle™ databases, Sybase™ databases, or other relational databases.

In some embodiments, computing device 16 is communicatively connected to one or more remote memory devices (e.g., remote databases—not shown) through a network (not shown). The remote memory devices can be configured to store information that computing device 16 can access and/or manage. By way of example, the remote memory devices could be document management systems, Microsoft SQL database, SharePoint databases, Oracle databases, Sybase databases, Cassandra, HBase, or other relational or non-relational databases or regular files. Systems and methods consistent with disclosed embodiments, however, are not limited to separate databases or even to the use of a database.

Programs 44 may include one or more software or firmware modules causing processor 36 to perform one or more functions of the disclosed embodiments. Moreover, processor 36 can execute one or more programs located remotely from computing device 16. For example, computing device 16 can access one or more remote programs that, when executed, perform functions related to disclosed embodiments. In some embodiments, programs 44 stored in memory 42 and executed by processor 36 can include one or more of design, fabrication, and/or analysis apps 48 and operating system 50. Apps 48 may cause processor 36 to perform one or more functions of the disclosed methods.

Operating system 50 may perform known operating system functions when executed by one or more processors such as processor 36. By way of example, operating system 50 may include Microsoft Windows, Unix, Linux, OSX, IOS, Raspberry Pi OS (e.g., Rapbian), Android, or another type of operating system 50. Accordingly, disclosed embodiments can operate and function with computer systems running any type of operating system 50.

I/O devices 38 may include one or more interfaces for receiving signals or input from a user and/or machine 14, and for providing signals or output to machine 14 that allow structure 12 to be printed. For example, computing device 16 can include interface components for interfacing with one or more input devices, such as one or more keyboards, mouse devices, and the like, which enable computing device 16 to receive input from a user.

Figure 2:
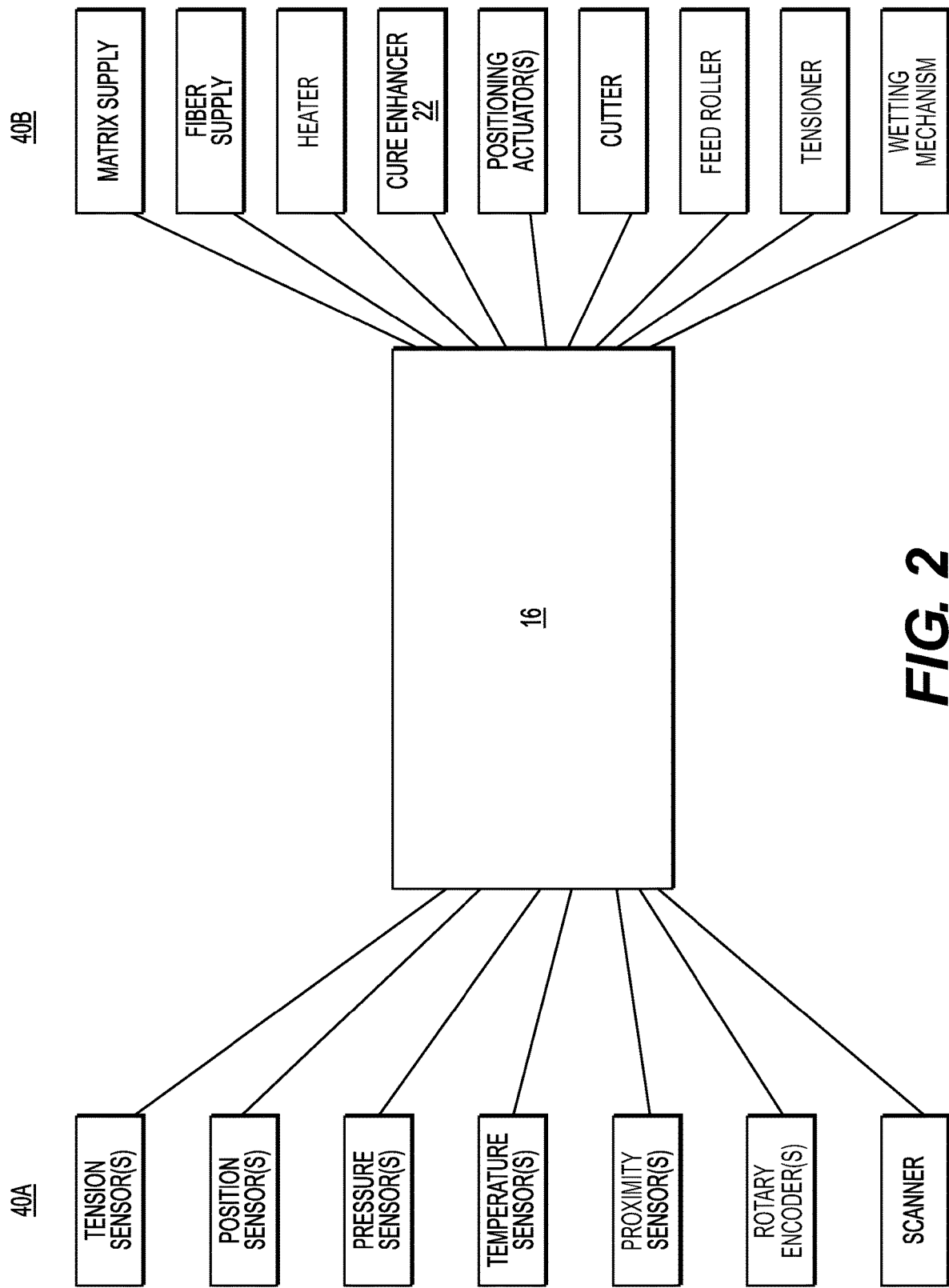
FIG. 2 is a schematic illustration of the control system of FIG. 1.

Peripheral device(s) 40 may be standalone devices or devices that are embedded within or otherwise associated with machine 14 and used during fabrication of structure 12. As shown in FIG. 2, peripherals 40 can embody input devices (e.g., one or more sensors, such as tension sensors, position sensors, pressure sensors, temperature sensors, proximity sensors, level sensors, rotary encoders, scanners, potentiometers, and other sensors known in the art) 40A and/or output devices (e.g., one or more actuators, such as a matrix supply, a fiber supply, a heater, a pump, cure enhancer 22, a positioning motor, a cutter, a feed roller, a tensioner, a wetting mechanism, a compactor, etc.) 40B. In some embodiments, peripherals 40 may, themselves, include one or more processors (e.g., a programmable logic control (PLC), a computer numeric controller (CNC), etc.), a memory, and/or a transceiver. When peripheral device(s) 40 are equipped with a dedicated processor and memory, the dedicated processor may be configured to execute instructions stored on the memory to receive commands from processor 36 associated with video, audio, other sensory data, control data, location data, etc., including capture commands, processing commands, motion commands, and/or transmission commands. The transceiver may include a wired or wireless communication device capable of transmitting data to or from one or more other components in system 10. In some embodiments, the transceiver can receive data from processor 36, including instructions for sensor and/or actuator activation and for the transmission of data via the transceiver. In response to the received instructions, the transceiver can packetize and transmit data between processor 36 and the other components.

Design, fabrication, and/or analysis apps 48 may cause computing device 16 to perform methods related to generating, receiving, processing, analyzing, storing, and/or transmitting data in association with operation of machine 14 and corresponding design/fabrication/analysis of structure 12. For example, apps 48 may be able to configure computing device 16 to perform operations including: displaying a graphical user interface (GUI) on display 34 for receiving design/control instructions and information from the operator of machine 14; capturing sensory data associated with machine 14 (e.g., via peripherals 40A); receiving instructions via I/O devices 38 and/or the user interface regarding specifications, desired characteristics, and/or desired performance of structure 12; processing the control instructions; generating one or more possible designs of and/or plans for fabricating structure 12; analyzing and/or optimizing the designs and/or plans; providing recommendations of one or more designs and/or plans; controlling machine 14 to fabricate a recommended and/or selected design via a recommended and/or selected plan; analyzing the fabrication; and/or providing feedback and adjustments to machine 14 for improving future fabrications.

FIGS. 3-8 are flowcharts depicting exemplary methods that may be implemented by computing device 16 during design, analysis, and/or fabrication of structure 12 by machine 14. FIGS. 12-25 depict operations outlined in the flowcharts of FIGS. 3-8. FIGS. 3-8 and 12-25 will be discussed in detail in the following section to further illustrate the disclosed concepts.

INDUSTRIAL APPLICABILITY

The disclosed systems may be used to continuously manufacture composite structures having any desired cross-sectional shape, length, density, stiffness, strength, and/or other characteristic. The composite structures may be fabricated from any number of different reinforcements of the same or different types, diameters, shapes, configurations, and consists, and/or any number of different matrixes. Operation of system 10 will now be described in detail, with reference to the flowcharts of FIGS. 3-8 and the image of FIGS. 12-25.

Figure 3:
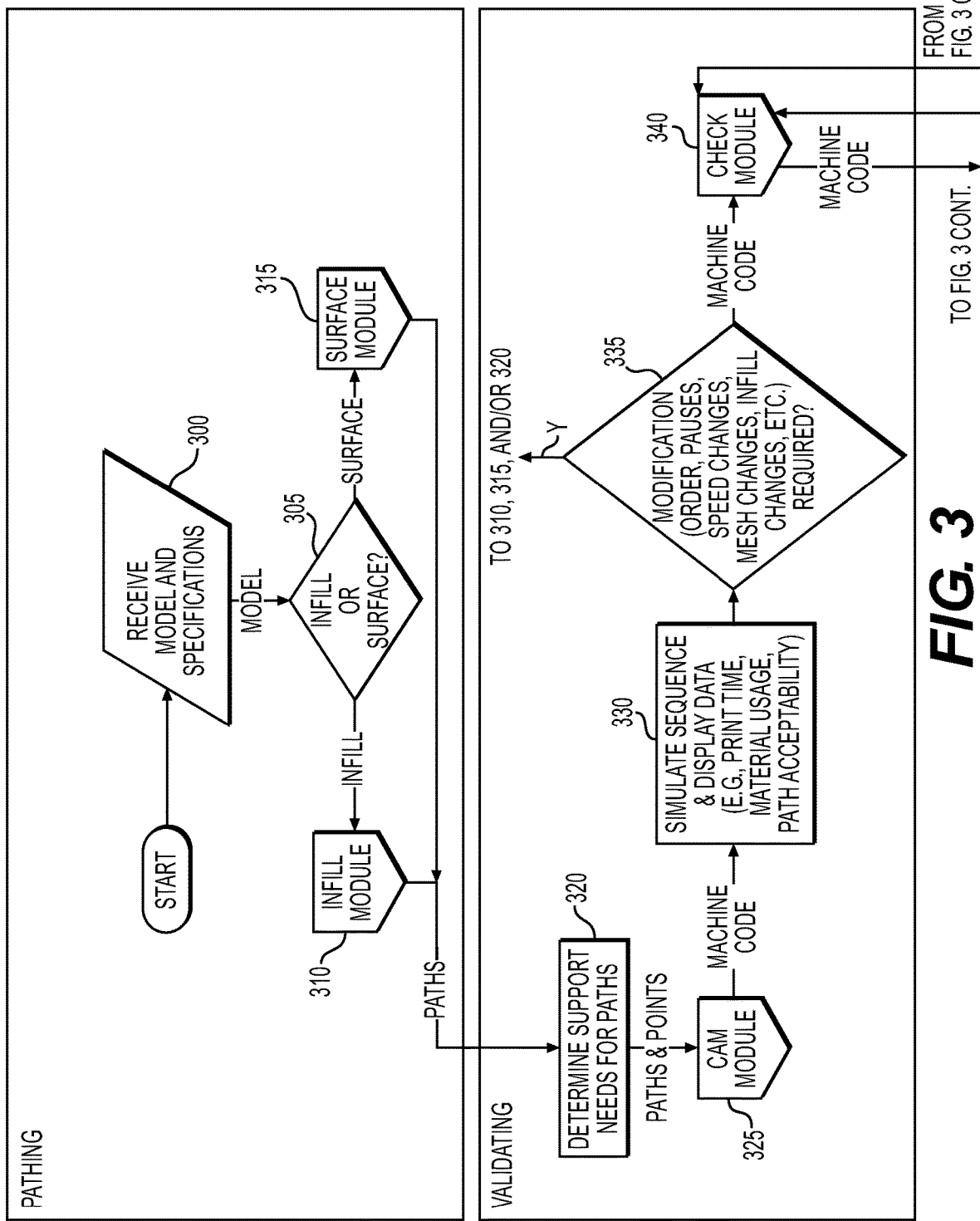
FIGS. 3, 4, 5, 6, 7 and 8 are flowcharts representing exemplary methods that may be implemented by the control system of FIGS. 1 and 2.
Figure 3:
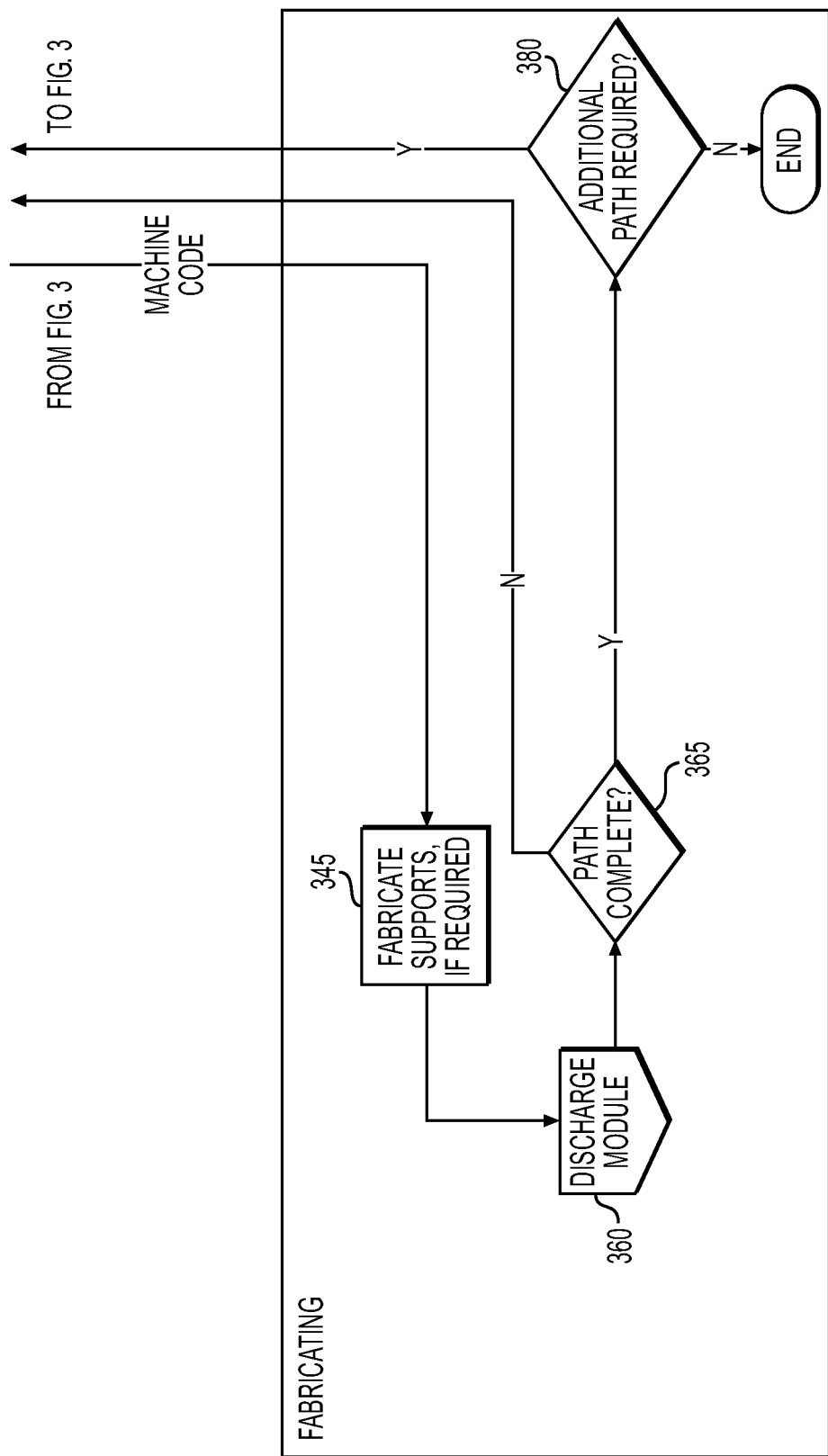

As can be seen in the flowchart of FIG. 3, the creation of structure 12 may generally be divided into three different phases, including: Pathing, Validating, and Fabricating. The Pathing Phase may generally be associated with defining of structure 12 and generating of points at which machine 14 should pass through during material discharge to fabricate structure 12 in the defined manner, as well as compiling of the points into one or more ordered paths. The Validating Phase may generally be associated with ensuring that the paths can followed by machine 14 during discharging of particular materials and preparation of the paths for ingestion by machine 14. The Fabricating Phase may generally be associated with activation of machine 14 to follow the ingested paths, as well as iterative and/or live adjusting of the paths based on real-time observations of the fabricating process.

The Pathing Phase of structure creation may begin with receipt by processor 36 (e.g., via I/O device(s) 38) of one or more virtual models of structure 12 and associated specifications from a user of system (Step 300). The virtual model be received from any computer-aided drafting (CAD) system available, for example as a data file. The model may be a 2D model and received as an .SVG, .AI, .EPS, .PDF, .DXF, etc. or a 3D model and received as an .STL, .OBJ, .PLY, .3MF, .AMF, etc. The specifications may include, among other things, do-not-exceed physical envelopes of structure 12, (e.g., an exterior and/or interior boundary definition of structure 12 in which structure 12 is to reside and function) guide curves, slice planes or other geometry, expected operating conditions (e.g., force loading, deflection loading, vibratory loading, thermal loading, environmental loading, etc.), desired characteristics (e.g., hardness, weight, buoyancy, conductivity, shielding, etc.), and/or desired performance (e.g., minimum values, maximum values, specified matrix identification and/or material properties, specified fiber identification and/or material properties, and/or acceptable ranges for particular material parameters, such as conductance, stiffness, strength, etc.).

Processor 36 may then prompt for and receive input from the user indicative of a type of fabrication process to be next performed by machine 14 (Step 305). That is, structure 12 may require one or more different processes be performed for fabrication to be complete, and not all the processes may be performed at the same time. These processes may include, among other things, an infill process and a surface process. The infill process may be associated with fabrication of an inner portion (e.g., a skeleton, scaffold, frame, or other foundational configuration of structure 12), while the surface process may be associated with an outer portion (e.g., a skin, outer layer, or other exposed contour) that is to be located adjacent, and/or around the inner portion. In general, an infill may have a courser or less-refined characteristic than the surface. The input received at Step 305 may be fed into either a corresponding Infill Module (Step 310) or a corresponding Surface Module (Step 315), both of which may be able to generate points through which head 20 should move during material discharge to fabricate the respective inner or outer portions. In addition to generating the points, the points may be grouped within the corresponding module(s) into any number of different paths, each path having a start point and an end point corresponding to a distinct fabrication event of head 20. The Infill and Surface Modules will be discussed separately in more detail below.

After the Infill and/or Surface Modules generate the path(s) associated with fabrication of the inner and/or outer portions of structure 12, processor 36 may determine a need for supports to prop up or otherwise stabilize the paths (Step 320). In particular, depending on the size, shape, orientation, mass, material, etc. of structure 12, some portions of structure 12 may need to be supported during fabrication along the paths in order to maintain a desired integrity (e.g., in order to inhibit warping, drooping, breaking, or other straining). Processor 36 may identify these portions and generate corresponding points at which support material should be discharged (e.g., by machine 14 or another support-only machine—not shown). These identification and/or point generation operations may be rule-based, for example determined based on thresholds associated with overhang values, angles, masses, fiber densities, fabrication-induced forces, curvatures, etc.).

The paths generated by the Infill and/or Surface Modules and the corresponding support points may be agnostic to the particular configuration of machine 14 that is to discharge material along each of the paths and at each of the support points. In other words, the paths and points may be generated regardless of the kinematics, capacities, specifications, etc. of machine 14. Accordingly, after their generation, processor 36 may be configured to direct the paths and support points into a CAM module, where the paths and/or points are validated and sequenced for use with the particular configuration of machine 14 (Step 325). The CAM Module will be discussed separately in more detail below. It is contemplated that the CAM Module may alternatively be referenced during initial generation of the paths and/or support points, if desired, such that only points and paths that are within the capacity of machine 14 to fabricate are generated.

The sequence of validated paths and support points may then be simulated by processor 36, and the sequence and data associated with completion of the paths and support points may be displayed (Step 330). Simulation may include, for example, a presentation on display 34 of an order that each path and support point will be discharged or passed through by machine 14, a presentation of head 20 during discharge (e.g., showing location, orientation, speeds, etc.), a presentation of support 18, a presentation of structure 12, a presentation of any required tool changes, etc. The data shown on display 34 may include a time since start of discharge, a total time elapsed, an amount of material discharged, a percentage of path completed, a time remaining to completion, a total amount of time required, etc. The simulation may provide visual clarity to a user regarding the process to be completed, and also be used to automatically check for collisions and other machinability issues.

Once the paths, support points, and print data have been shown on display 34, processor 36 may be configured to receive input from the user regarding modifications to and/or decoration of the paths and/or support points (Step 335). For example, the user may be able to modify an order in which the paths and/or support points within a particular path are completed, institute pausing between execution of particular paths and/or points, adjust a speed of head 20 during particular paths and/or support points, adjust minimum path lengths and/or gaps between paths, adjust a pose of head 20 along the paths, adjust an intensity of cure enhancers 22 at particular points within a given path, adjust head travel speed vs. cure intensity (e.g., based on curvature and/or local angle), override one or more setpoints (e.g., compactor behavior, compaction forces, heater settings, etc.), etc.

If modifications are requested at this point in time (Step 335: Y), control may return to Steps 310, 315, and/or 320 (depending on the particular modifications), where the modifications are implemented and new paths and/or support points are generated and/or thereafter sequenced. However, if no modifications are requested (Step 335: N), machine code corresponding to the paths and support points may be produced and directed to a Check Module (Step 340). As will be explained in greater detail below, the Check Module may be configured to check if conditions and settings of machine 14 are correct before initiating fabrication of structure 12 using the machine code. Control may then proceed from the Validating Phase into the Fabricating Phase.

Generally, if supports were determined at Step 320 to be necessary, the supports may be fabricated first (e.g., before fabricating structure 12—Step 345). The supports may be fabricated in any manner known in the art. For example, the supports may be fabricated by machine 14 using matrix-coated fibers or matrix only (e.g., without fibers). Alternatively, the supports may be fabricated by another type of machine 14. It is contemplated that the supports could alternatively be fabricated during and/or after fabrication of structure 12, if desired. For example, after fabrication of one or more structural layers, head 20 may be swapped out from machine 14 for a support-fabricating head 20. One or more support layers may then be discharged, before another swap back for the original structural-fabricating head 20. Other strategies (e.g., swapping out materials within the same head 20) may also or alternatively be employed.

After required supports have been fabricated, control may progress to a Discharge Module (Step 355), which is responsible for controlling operation of machine 14 during discharge of matrix-wetted reinforcements from head 20. As will be explained in more detail below, processor 36 may be configured to continuously monitor the discharge of material from head 20, not only for quality control purposes, but also to track the progress according to the selected plan. This monitoring may be completed, for example, based on signals received from one or more input devices of peripherals 40A. Processor 36 may determine when a current path in the plan is complete (e.g., by comparing a current position of head 20 to an end position in the path—Step 365). If the path is not yet complete, control may return to Step 340. Otherwise, processor 36 may determine if any additional paths are required to complete fabrication of structure 12 (Step 380). Processor 36 may determine that additional paths are required, for example, based on comparison of any completed paths with a number and/or identification of paths included within the fabrication plan for structure 12. When additional paths are required, control may return from Step 380 to Step 340. Otherwise, the Fabricating Phase may be considered complete.

Figure 4:
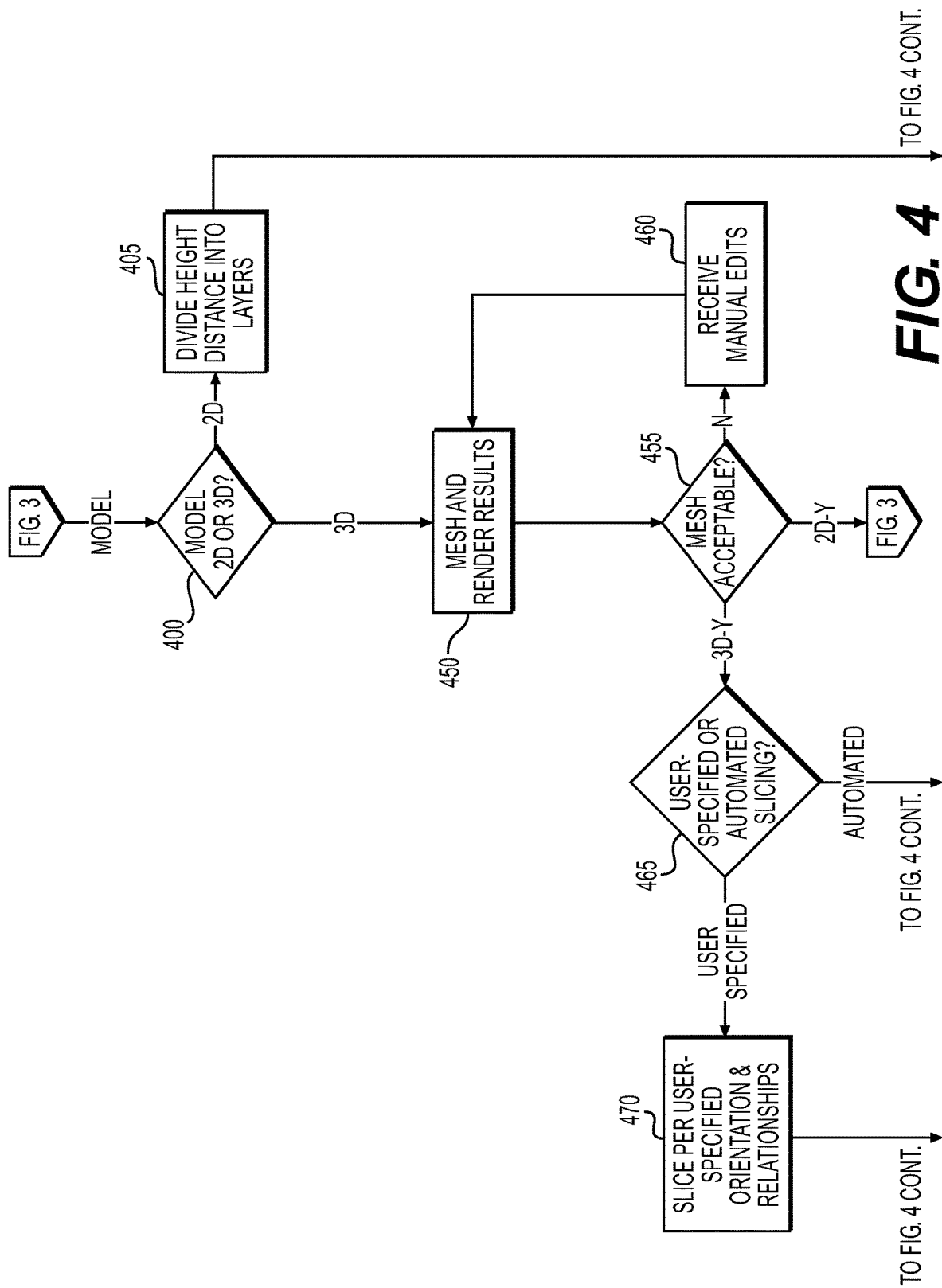
Figure 4:
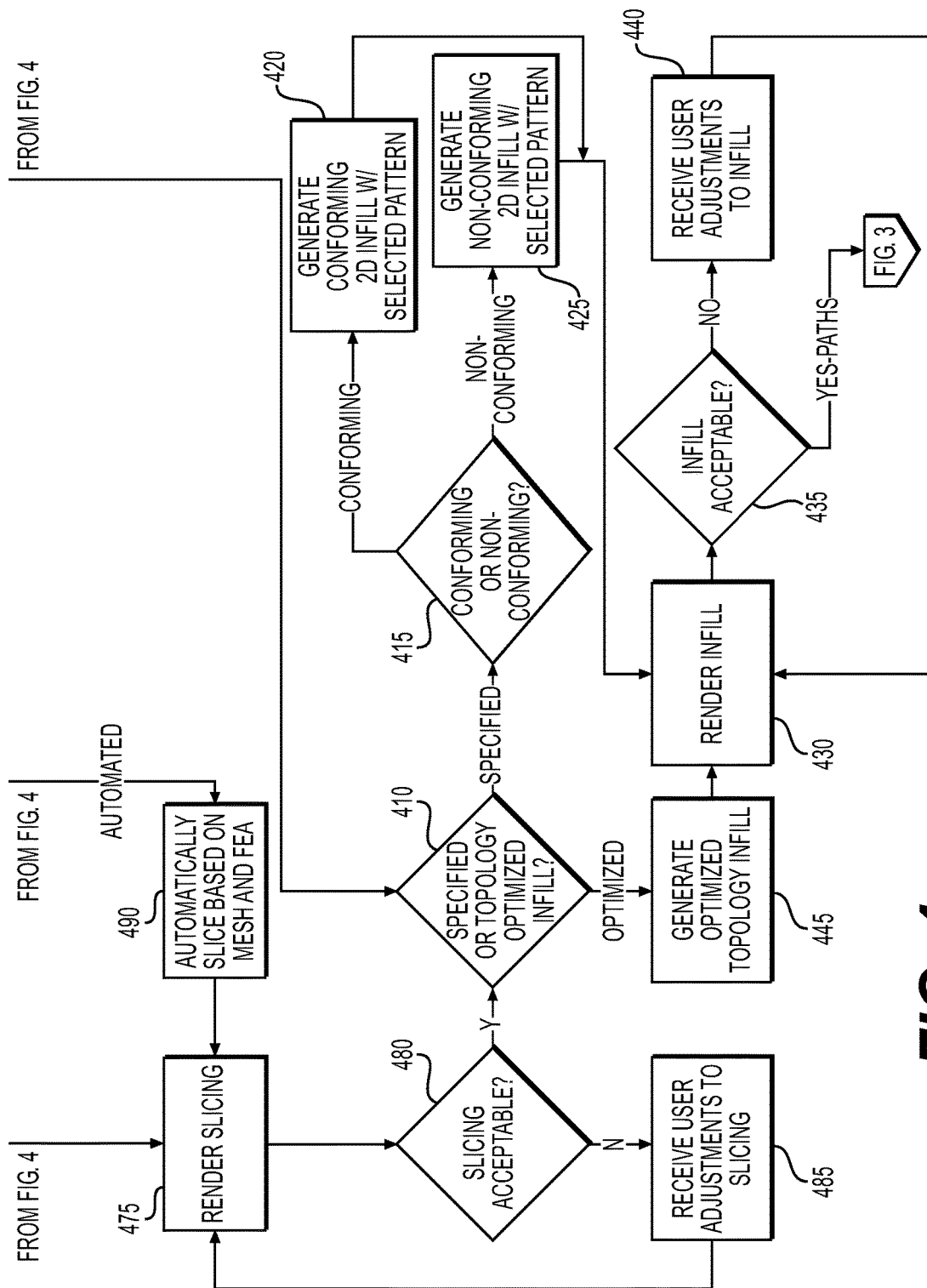

An exemplary Infill Module is illustrated in detail in FIG. 4. As shown in the flowchart of FIG. 4, once control has passed into the Infill Module, processor 36 may determine if the virtual model of structure 12 received at Step 300 (referring to FIG. 3) is a 2D or 3D model. This determination may be made based directly on input from the user (e.g., manual selection of an associated option) or based on a type of the file received. For example, if the file type is one of .SVG, .AI, .EPS, or .PDF, processor 36 may determine that the virtual model is a 2D model, and control may progress to Step 400. An exemplary 2D model is illustrated in FIG. 12.

Figure 12:
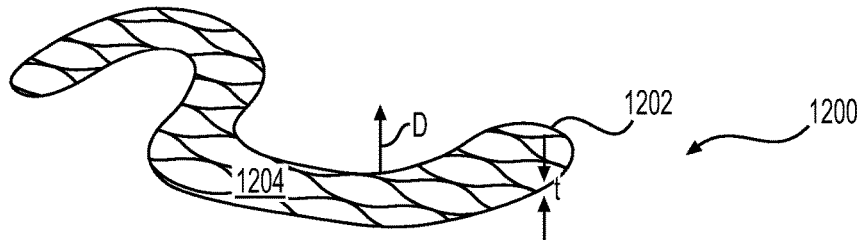
Figure 13:
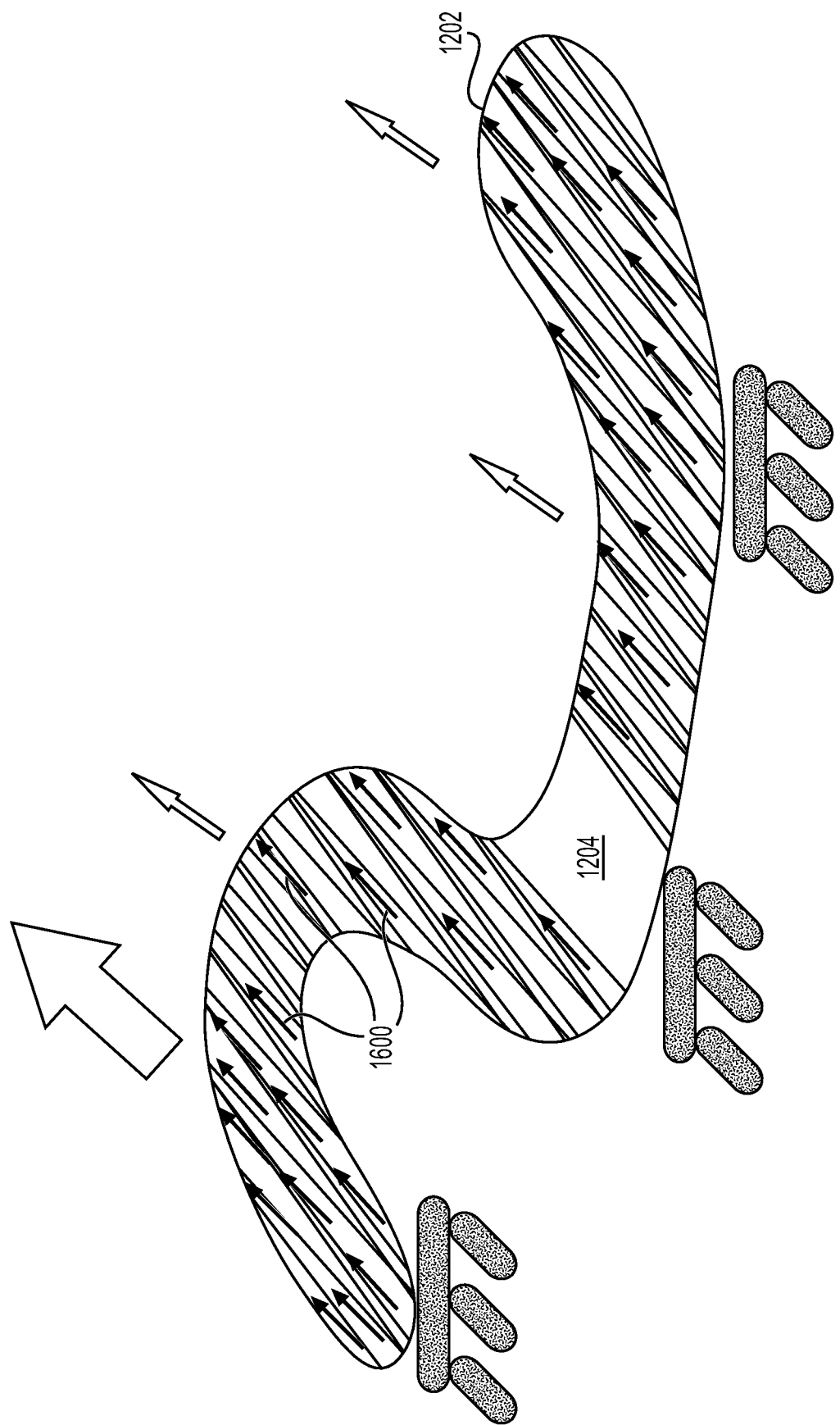

As shown in FIG. 12, the 2D model may include a sketch having a polygonal outline 1200 of a planar shape that is to be fabricated layer-by-layer in an overlapping manner until a user-specified height distance D, which is generally orthogonal to the plane of the shape, has been reached. In some embodiments, the shape may be specified to change throughout part or all of the height distance D (e.g., taper inwards, taper outwards, sweep to another polygonal outline, etc.). A thickness t of each layer 1202 may be related to a diameter or thickness of the material discharged by machine 14 (e.g., related to a diameter or thickness of the reinforcement and the matrix coating the reinforcement, related to an outlet diameter of head 20, etc.). The thickness t of each layer 1202 may also be related to an amount of pressure applied to the discharging material by the compactor of machine 14 and/or curing characteristics of the matrix (e.g., expansion, shrinkage, etc.).

At a Step 405, processor 36 may be configured to divide the user-specified height distance D by the thickness t to generate a number of the overlapping layer(s) 1202 discussed above. Processor 36 may then receive input from the user regarding a pattern 1204 of infill to be used to populate each layer 1202 with material (Step 410). For example, the user may be able to specify that a particular 2D pattern 1204 be utilized or that processor 36 is to generate a pattern 1204 that optimizes a topology of each layer 1202. The particular pattern 1204 may include a selection of one or more predetermined patterns (e.g., a simple line pattern—see FIG. 10, a sine wave pattern—see FIGS. 11 and 12, a sawtooth pattern—see FIG. 9, a diamond pattern, a hexagonal pattern, etc.) and/or a function defined by the user. In addition, the user may be able to specify a different pattern 1204 for each layer 1202, a set of patterns 1204 to be repeated throughout layers 1202, and/or relationships (e.g., relative angles, offsets, scales, rotations, densities, and other transformations) between adjacent-layer patterns 1204. The user may also specify a distance between adjacent features of infill within a layer 1202, angles for the features, scaling of the features, frequencies of the features, amplitudes of the features, and/or other similar criteria.

In some applications, the pattern specified by the user could be a 3D pattern. In these applications, the 3D pattern may need to be sliced after placement and/or orientation within boundaries of the virtual model.

Figure 9:
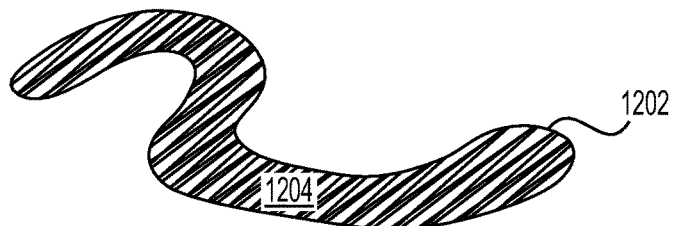
FIGS. 9, 10, 11, 12, 13, 14, 15, 16, 17, 18, 19, 20, 21, 22, 23, 24, and 25 are images depicting steps shown in the flowcharts of FIGS. 3-8.
Figure 10:
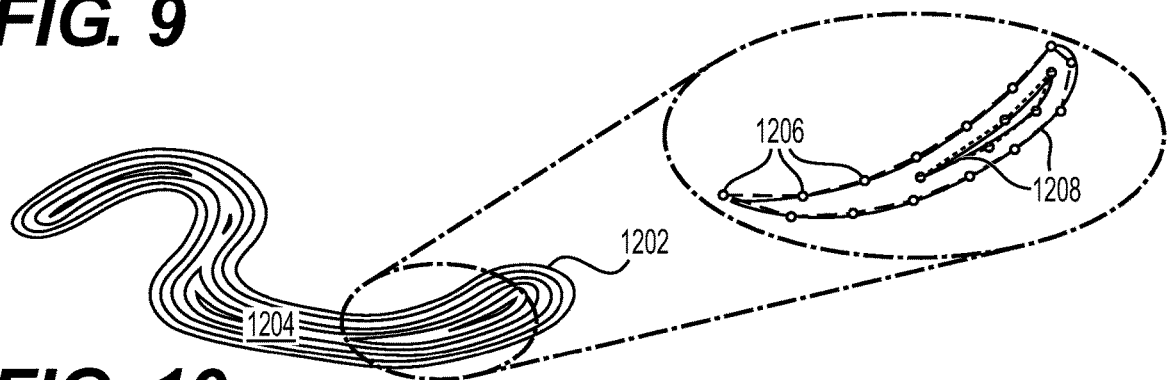
Figure 11:
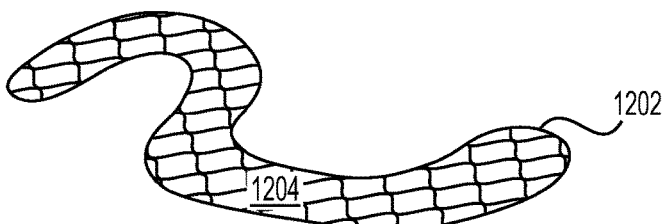

When the user selects to specify a particular pattern 1204, the user may also select whether the specified pattern 1204 is to be conforming or non-conforming (Step 415). A conforming pattern may be a pattern 1204 having general contours that approximate adjacent boundaries (e.g., the polygonal shape of the 2D sketch or the trajectory of an adjacent infill feature that is approximating the polygonal shape), without significantly distorting angular features of the pattern (although segments within the pattern may be scaled and/or curved). A non-conforming pattern may be a pattern 1204 overlaying the polygonal shape without being affected by the shape. Examples of conforming patterns are illustrated in FIGS. 9 and 10. Examples of non-conforming patterns are illustrated in FIGS. 11 and 12. Note that a conforming pattern can still have one or more second and/or higher order patterns embedded therein, if desired. Also note that not all available patterns may have a conforming counterpart.

Processor 36 may then generate for each layer 1202 infill features having the user-selected and/or specified parameters (Step 420 or Step 425). This generation may include defining of points 1206 between which head 20 must move while discharging material, as well as grouping of points 1206 into any number of discrete paths 1208 having different starts, ends, and any number of sequentially arranged intermediate points 1206. In general, points 1206 may be coincident with infill patterns 1204 discussed above, and placed at ends of and along line segments within the patterns 1204. Points 1206 may mark locations through which head 20 must pass in order to follow infill patterns 1208 within an acceptable tolerance. A distance between adjacent points 1206 of a particular pattern may be selected based on a standard or user-specified resolution, with closer points providing higher resolution but also slowing a fabrication process.

It is contemplated that head 20 (e.g., a tip end of nozzle 30) may be regulated by processor 36 to follow different trajectories between points 1206 (e.g., regardless of an orientation of head 20). In one example, the tip end of nozzle 30 may follow a straight-line path between adjacent points 1206. In another example, the tip end of nozzle 30 may be provided a curvature function to follow between adjacent points. Other strategies may also or alternatively be implemented.

Any number of separate and distinct paths 1208 may be compiled from points 1206 discussed above based on a need to reposition head 20 during fabrication of structure 12, without discharging material during the repositioning. In general, a longer and more-continuous path 1208 may result in a greater amount of material being deposited within a shorter amount of time. In addition, a longer path 1208 may require fewer cuts of the reinforcement during fabrication of structure 12, which results in less wear on machine 14 and further time savings. Finally, a longer and more-continuous path 1208 may result in a greater performance (e.g., stiffness, strength, conductivity, heat transfer, etc.), in some applications (e.g., due to longer strands of reinforcement transferring loads).

Paths 1208 may be compiled from existing points 1206 based on a variety of different strategies. For example, within a base layer 1202, a first path 1208 may begin with a center-most point 1206 of the particular layer 1202; an outer-most point 1206; a first-generated point 1206; a last-generated point 1206; a point 1206 associated with a longest, shortest, straightest, or crookedest line or line segment of pattern 1204; a point 1206 functioning as a vertex between two line segments; a point 1206 within only one other adjacent point 1206 (e.g., an end point as opposed to a middle point); or another point 1206, and continue to a next closest and/or adjacent point 1206 within a same line or line segment. Path 1208 may be inhibited from including points 1206 or a sequence of points 1206 that causes crossing over any portion of an earlier discharged path 1208 (see, for example, the purple inner and white outer paths in the close-up of FIG. 10 do not cross) within the same layer. Compilation of points 1206 into a particular path 1208 may continue until a next closest or adjacent point 1206 would require head 20 to be repositioned without discharging material during the repositioning. For example, when moving head 20 from the purple inner path 1208 to the white outer path 1208 of FIG. 10, head 20 should not discharge material and, thus, the paths 1208 are compiled to be separate. Compilation may continue from the base layer 1202 through the intermediate layers 1202 sequentially, until paths 1208 in a final or top layer 1202 have been compiled (e.g., from layer 1202 of FIG. 12 through FIG. 11, FIG. 10, and then FIG. 9). In some embodiments, one or more paths 1208 (e.g., a continuous reinforcement) may extend between adjacent layers 1202.

Once all of points 1206 in all layers 1202 of structure 12 have been compiled into paths 1208, the infill patterns 1204 and/or paths 1208 may be rendered on display 34 for inspection by the user (Step 450). Each of layers 1202 may be separately viewable, and options may be available to adjust (e.g., turn on/off, zoom in, spread apart, etc.) viewing of particular layers 1202 and/or features (e.g., infill pattern 1204, points 1206, paths 1208, etc.) of each layer 1202. Processor 36 may then be configured receive an indication from the user that the pattern(s) 1204, points 1206, and/or paths 1208 (e.g., known as a mesh) are acceptable or require adjustment (Step 455). If the 2D mesh is acceptable to the user (Step 455: 2D-Y), processor 36 may return at least paths 1208 to Step 320 (referring to FIG. 3). However, if the pattern(s) 1204, points 1206, and/or paths 1208 are not acceptable (Step 455: N), processor 36 may receive modifications from the user (Step 460). These modifications may include among other things, changes to one or more pattern(s) 1204 (e.g., selection of a different pattern and/or changes to angles, offsets, amplitudes, frequencies, etc.), changes to one or more points 1206 (e.g., repositioning of points, addition of points, subtraction of points, etc.), and changes to one or more paths 1208 (e.g., changes to the particular points 1206 included within a particular path 1208, a sequential order of the paths 1208, etc.).

Returning to Step 410, when a user selects for infill of one or more layers 1202 to be topology optimized, processor 36 may advance to Step 445 instead of Step 415. At Step 445, processor 36 may implement one or more mathematical algorithms to layout matrix-coated reinforcements within the interior of the selected layer(s). Many different optimization processes may be implemented at Step 445, and Step 445 may be different (e.g., simpler) when the virtual model is 2D as opposed to 3D.

Figure 16:
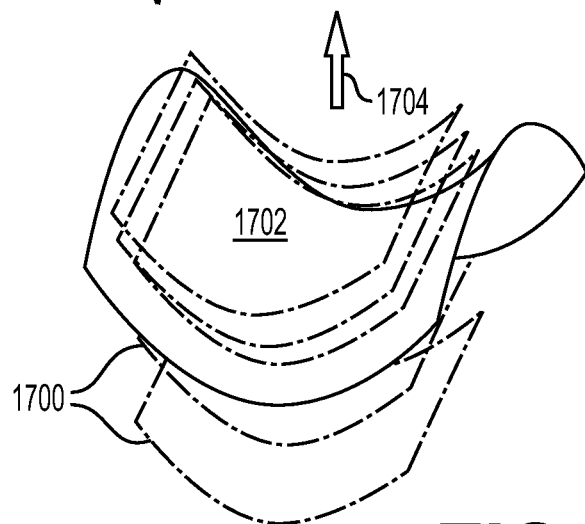

A simplified example of Step 445 performed for a 2D virtual model is illustrated in FIG. 16. As shown in this figure, processor 36 may utilize the specifications (e.g., boundary load conditions, material properties, etc.) provided at Step 300 (referring to FIG. 3) to determine a basic field 1600 of vectors (e.g., force vectors, conductivity vectors, heat transfer vectors, etc.) passing through the layer(s) 1202. Processor 36 may then select one of a plurality of available patterns 1204 of infill and orient the pattern 1204 within the layer(s) in a manner that provides a greatest general alignment of pattern segments with the basic vector field 1600. In some applications, processor 36 may additionally adjust parameters (e.g., spacing, frequency, amplitude, etc. —see left vs right side of layer 1202 shown in FIG. 13) of the infill pattern 1204 to create greater alignment of pattern segments with the basic vector field 1600. For example, processor 36 may generate a pattern 1204 having sparser or no infill (see left/right-center of FIG. 13) at locations where lower-force transmission is expected, and denser infill (see left of FIG. 13) at other locations where higher-force transmission is expected. Control may pass from Step 445 to Step 430 described above.

Returning to Step 400, when processor 36 determines that the virtual model is a 3D model, control may advance to Step 450 instead of Step 405. At Step 450, processor 36 may generate a mesh of interconnected geometrical shapes (e.g., tetrahedrons, hexahedrons, pyramids, triangular prisms, etc.) within the boundaries of the virtual model, and render the mesh on display 34 for examination by the user. The shapes may allow for simplification of mathematical equations applied to each shape that can be used to approximate a solution for the overall model. Exemplary approximations will be discussed in more detail below.

Once the mesh has been generated and rendered on display 34, processor 36 may receive input from the user regarding acceptability of the mesh (Step 455). If the mesh is unacceptable (Step 455: N), the user may have the opportunity to manually edit the mesh. Processor 36 may receive the manual edits (Step 460), and control may return to Step 450. These edits may include, for example, a type and or sizes of the geometrical shapes used in the mesh, boundary locations of particular shapes, densities of the shapes at particular locations, etc. If the 3D mesh is acceptable (Step 455: 3D-Y), processor 36 may receive a selection of whether the user desires to manually specify how the 3D model will be virtually sliced or for the processor 36 to automatically implement virtual slicing (Step 465). Note that slicing may not be required with a 2D model.

When the user selects to manually slice the 3D model of structure 12, processor 36 may receive input from the user defining one or more slicing surfaces and/or relationships between the surfaces (Step 470). It should be noted that the slicing surface(s) may be planar or non-planar, conforming to each other or non-conforming, parallel or non-parallel, and equally or unequally spaced. For example, the user may be able to select a datum having a particular shape (e.g., a planar datum, a spherical datum, a cylindrical datum, etc.), place and orient the datum relative to the 3D model (or vice versa), choose a propagation direction of the datum through the 3D model, and/or choose one or more relationships (e.g., orientation, offset distance, etc.) between different datums within the 3D model. The datum may be one of a plurality of predefined and available datums, a surface of the 3D model, an imported surface, a surface constructed by the user, and/or a surface that is mathematically defined by the user.

Figure 14:
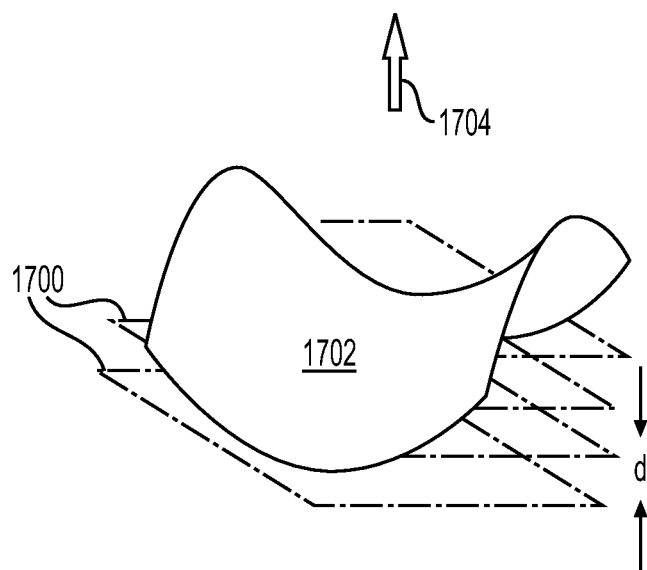
Figure 15:
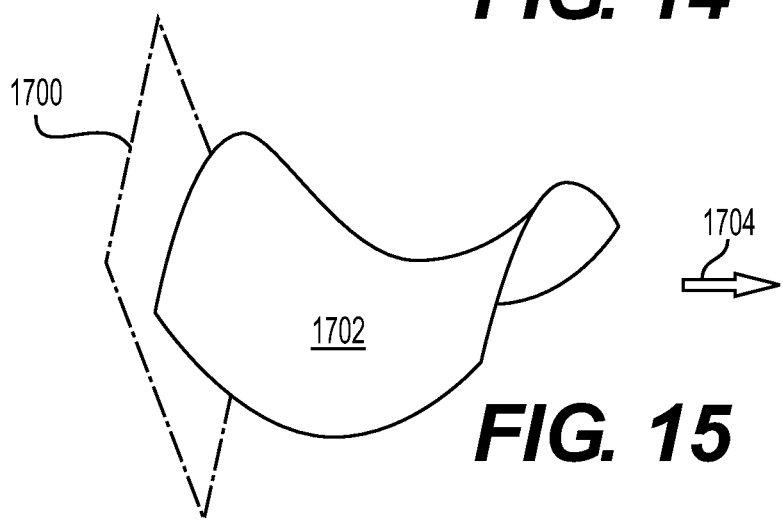

FIGS. 14, 15 and 16 illustrate different examples of options available to the user at Step 470. As shown in FIG. 14, the user may select a predefined planar datum 1700 for use in slicing a 3D model 1702 of structure 12. A first datum 1700 may be placed by the user at a first side of model 1702, and a first direction 1704 may be selected for propagation of datum 1700 through model 1702 during slicing. In addition, the user may specify an equal distance d between adjacent slices generated by datum 1700. The distance d may be selected to correspond with a thickness dimension of a particular fiber/matrix combination intended for use throughout fabrication of structure 12. It is contemplated that, in some applications, the distance d may be a default value based on the capabilities and/or current configuration of machine 14.

In FIG. 15, the same type of datum 1700 of FIG. 14 may again be selected by the user, but placed at a different location and/or orientation, and a different propagation direction 1704 may be selected. As seen from a comparison of FIGS. 14 and 15, model 1702 may be sliced differently based on these selections.

FIG. 16 illustrates selection of a different and 3D datum 1700, for example either a different one of the predetermined and available datums (e.g., a cylindrical datum), a datum constructed by the user (e.g., using lower edges of model 1702), or a datum defined mathematically by the user. As discussed above, the user may alternatively select an existing 2D or 3D surface of model 1702 as datum 1700, if desired. As also seen in FIG. 16, the user may select different distances between the slices of model 1702 at different locations. This different spacing may correspond, for example, with an intention to use different reinforcement/ matrix combinations, different print heads 20, etc. when fabricating the corresponding layers. As can be seen from FIGS. 14-16, the layers of model 1702 may be sliced utilizing datum 1700 to be conforming and/or parallel surfaces.

Figure 17:
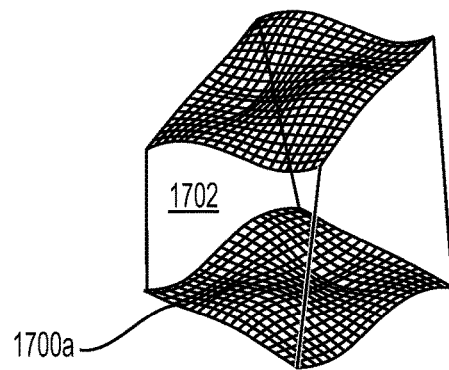
Figure 18:
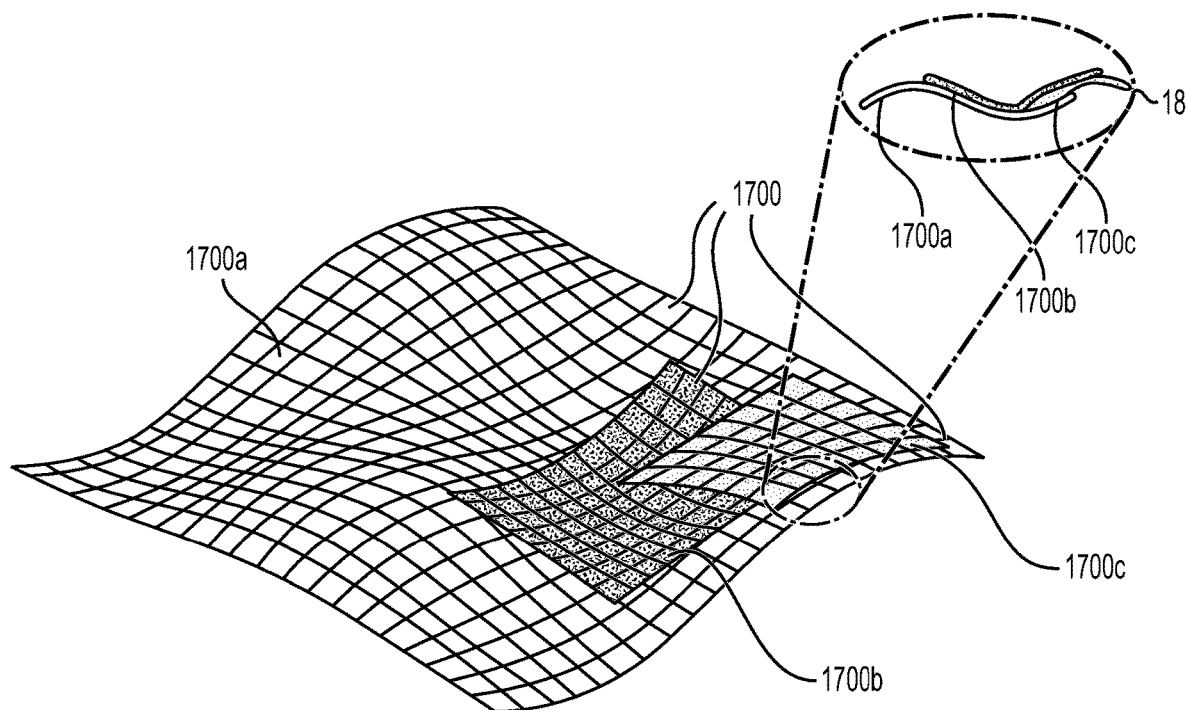
Figure 19:
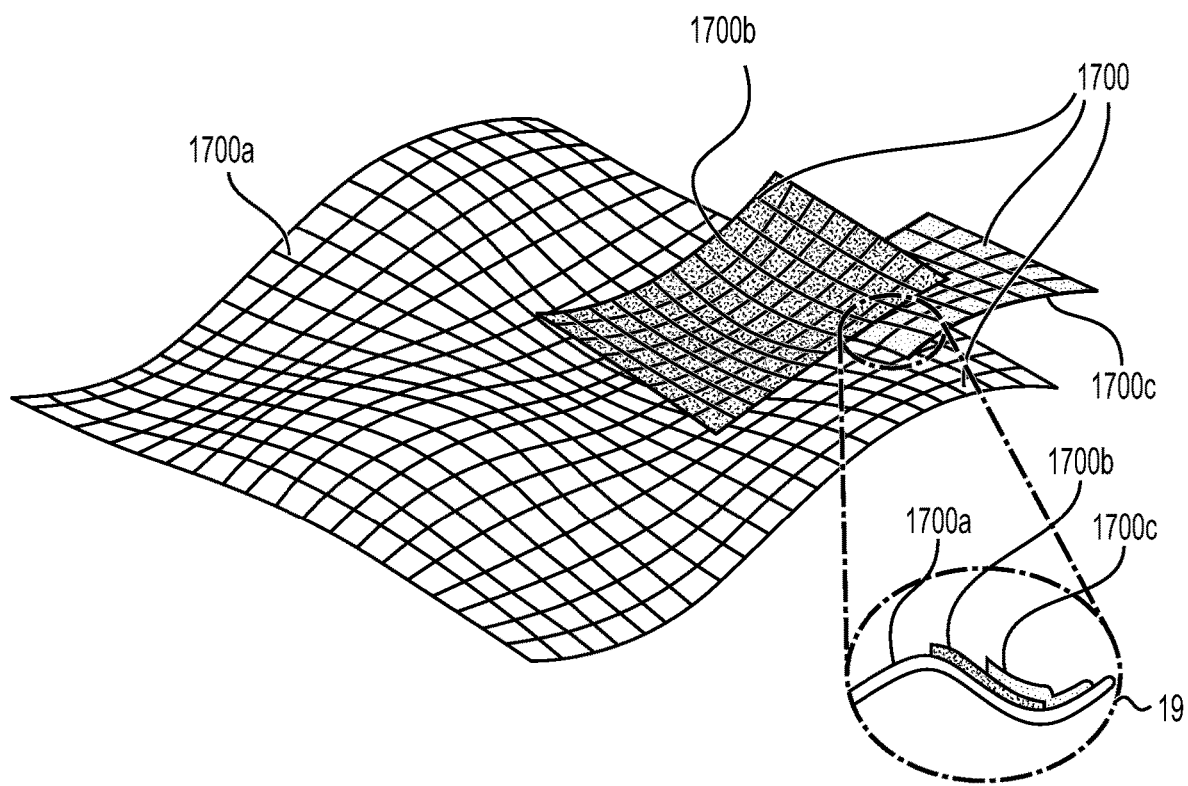

FIGS. 17, 18, and 19 illustrate alternative selections made by the user at Step 470. As shown in FIG. 17, datums 1700 used to slice a single model 1702 may be 3D, selected from surfaces of model 1702, and/or have different shapes and/or sizes. In the embodiment of FIG. 17, the different datums 1700 are generally conforming to contours of the model 1702. However, this may not always be true. For example, FIG. 18 illustrates a lower datum 1700*a*, an intermediate datum 1700*b*, and an upper datum 1700*c*. Datum 1700*b* may have contours conforming to a portion of datum 1700*a*. Datum 1700*c* may have contours conforming to a portion of datum 1700*b* and different contours conforming to the same or different portions of 1700*a*. As shown in FIG. 19, some contours (e.g., overhanging portions) of datums 1700*b* and 1700*c* may be unique and nonconforming to any portion of the other datums 1700, if desired. It is contemplated that each of datums 1700 could be assigned the same or different propagation directions through any desired distance d.

Figure 20:
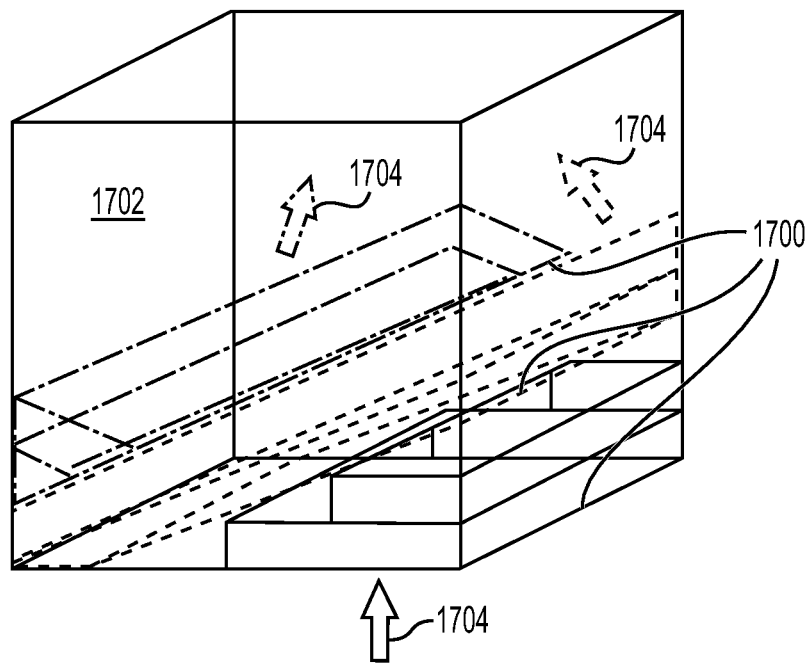

As shown in the example of FIG. 20, the use of nonconforming datums 1700 within the same model 1702 may allow for steering of fibers in multiple (e.g., three) dimensions, even when printing overlapping layers (i.e., even when not printing in free-space).

After slicing the virtual model, processor may render the slicing (Step 475) and receive feedback from the user regarding acceptability of the slicing (Step 480). When the slicing of Step 470 is unacceptable, processor 36 may receive user-specified adjustments to the slicing (Step 485). Control may then return from Step 480 to Step 475.

Returning to Step 465, when automatic slicing is requested by the user, control may proceed to a Step 490 instead of Step 470. At Step 490, processor 36 may utilize the mesh generated at Step 450 along with the model specifications (e.g., the boundary load conditions) and material specifications to generate a 3D vector field through the virtual model.

For example, processor 36 may initially consider the 3D model of structure 12 to behave isotropically relative to one or more properties (e.g., stress, strain, heat transfer, conductivity, etc.) specified by the user. Processor 36 may apply user-specified boundary conditions and, via Finite Element Analysis (FEA), determine how the user-specified property(ies) propagates through the individual shapes of the mesh defined at Step 450 to affect an overall performance of the virtual model. A gradient of the performance may then be used to generate a field of performance vectors passing in multiple dimensions through the model.

Slicing may be automatically implemented based on the vector field (Step 490). For example, one or more datum(s) 1700 may be generally aligned with the vector field (e.g., with the highest magnitude vector(s), such that the resulting paths can steer reinforcements in the general direction(s) of the performance vector(s). This may generally result in a performance enhanced structure 12. Control may then proceed from Step 490 to Step 475.

As stated above, topology optimization may proceed differently at Step 445 when the virtual model is 3D. For example, processor 36 may again implement FEA, but this time with an assumption that the virtual model will behave anisotropically. That is, processor 36 may select one or more patterns of infill to populate each of the slices generated at Step 490, and thereafter perform FEA based on user-defined material properties of fibers being placed along segments of the pattern(s). The pattern(s) may then be iteratively adjusted to optimize the user-defined performance properties.

In some applications, more than one performance property may be specified by the user for optimization. For example, the user may select a structural property (e.g., strength, stiffness, strain, deflection, toughness, hardness, ductility, etc.) and any number of non-structural properties (heat transfer, magnetism, electrical conductivity, reflectivity, etc.) as properties to be optimized. In this situation, the FEA process just discussed may be implemented first in regard to only a structural property based on user-supplied material specifications associated only with structural reinforcements (e.g., carbon fibers, glass fibers, Kevlar fibers, etc.).

The results of this FEA process may generate a structural shape, which can form the basis for optimization of any number of non-structural properties. For example, the shape produced by the FEA process may create an envelope within which functional reinforcements are allowed to be placed. After obtaining this structural shape, processor 36 may then determine one or more patterns for each slice of the virtual model. The patterns may then be used for placement of the functional reinforcements (i.e., functional reinforcements may only be placed at locations where structural reinforcements will exist), and processor 36 may again analyze the mesh of the virtual model with respect to the pattern(s) and user-suppled material specifications associated with the functional reinforcements (e.g., copper wires, optical tubes, nichrome wires, etc.). It is contemplated that a smoothing or purging operation may be implemented (e.g., to remove impossible points, artifact geometry, random features, etc.) prior to determining the patterns for each slice of the virtual model, if desired.

It should be noted that optimization routines may similarly be implemented with respect to different matrixes and/or additives. For example, the FEA process resulting in the structural skeleton could be implemented with a base structural resin. Thereafter, the FEA process may be repeated with non-structural performance enhancing additives included within the envelope of the structural skeleton.

Figure 5:
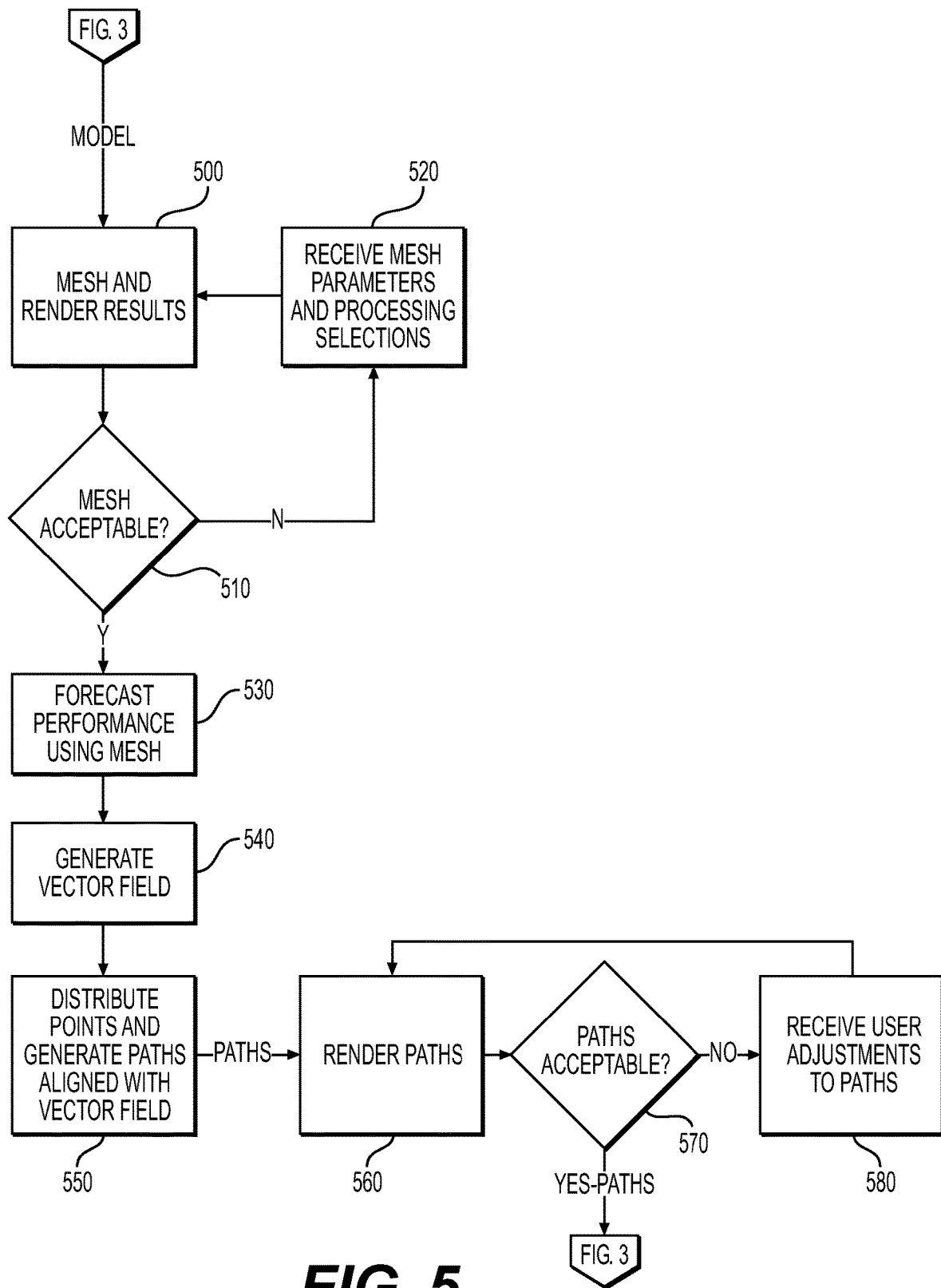

The Surface Module is illustrated in detail in FIG. 5. As shown in FIG. 5, surfacing may also be a function of anticipated surface loading of structure 12. Accordingly, once control passes into the Surface Module, processor 36 may generate a mesh of interconnected geometrical shapes over an outer surface of the virtual model, and render the mesh on display 34 for examination by the user (Step 500). The mesh may have a thickness that is a discrete dimensional multiple of the material(s) intended for use in surfacing any number of outer layers of structure 12.

Once the mesh has been generated and rendered on display 34, processor 36 may receive input from the user regarding acceptability of the mesh (Step 510). If the mesh is unacceptable (Step 510: N), the user may have the opportunity to manually edit the mesh. Processor 36 may receive the manual edits (Step 520), and control may return to Step 500. These edits may include, for example, a type and/or sizes of the geometrical shapes used in the mesh, boundary locations of particular shapes, densities of the shapes at particular locations, etc.

When the mesh is acceptable (Step 510: Y), processor 36 may use the mesh to forecast a user-requested performance of structure 12 under user-specified operating conditions (Step 530). In some embodiments, processor 36 may be utilize the boundary element method (BEM) to forecast the performance of structure 12. BEM is a numerical computational method of solving for fluid mechanics, acoustics, electromagnetics, fracture mechanics, and other performances at the surface of a modeled structure. BEM is generally computationally more efficient than other methods (e.g., FEA), because it utilizes a mesh over only the surface rather through a volume of the model. It is contemplated, however, that traditional FEA could alternatively be utilized to forecast the performance of the surface layer(s) of structure 12, if desired.

Similar to Step 490 discussed above, processor 36 may generate a vector field based on a gradient of the results from Step 530 (Step 540). Points 1206 may be distributed in any desired manner across the surface of structure 12 before or after completion of Step 540, and points 1206 may be compiled into any number of separate and distinct paths 1208 having trajectories generally aligned with the vector field (Step 550).

Once all of points 1206 in the surface of structure 12 have been compiled into paths 1208, the paths 1208 may be rendered on display 34 for inspection by the user (Step 560). Options may be available to adjust (e.g., turn on/off, zoom in, spread apart, etc.) viewing of particular features (e.g., points 1206, paths 1208, etc.). Processor 36 may then be configured receive an indication from the user that the points 1206 and/or paths 1208 are acceptable or require adjustment (Step 570). If the points 1206 and paths 1208 are acceptable to the user (Step 570: Y), processor 36 may return at least paths 1208 to Step 320 (referring to FIG. 3). However, if the points 1206 and/or paths 1208 are not acceptable (Step 570: N), processor 36 may receive modifications from the user (Step 580). These modifications may include among other things, changes to one or more points 1206 (e.g., repositioning of points, addition of points, subtraction of points, etc.) and changes to one or more paths (e.g., changes to the particular points 1206 included within a particular path 1208, a sequential order of the paths 1208, etc.). Control may then return to Step 560.

It should be noted that multiple alternative surfacing methodologies may be implemented at Step 315, if desired. For example, one or more of the methods disclosed in U.S. Provisional Patent Application No. 62/955,352 that was filed on Dec. 30, 2019 and which is incorporated herein by reference may be implemented at Step 315. Alternatively or additionally, geodesics, curve-limiting algorithms, etc. may be implemented to determine paths that head 20 must follow during discharge of surface-located reinforcements.

Figure 21:
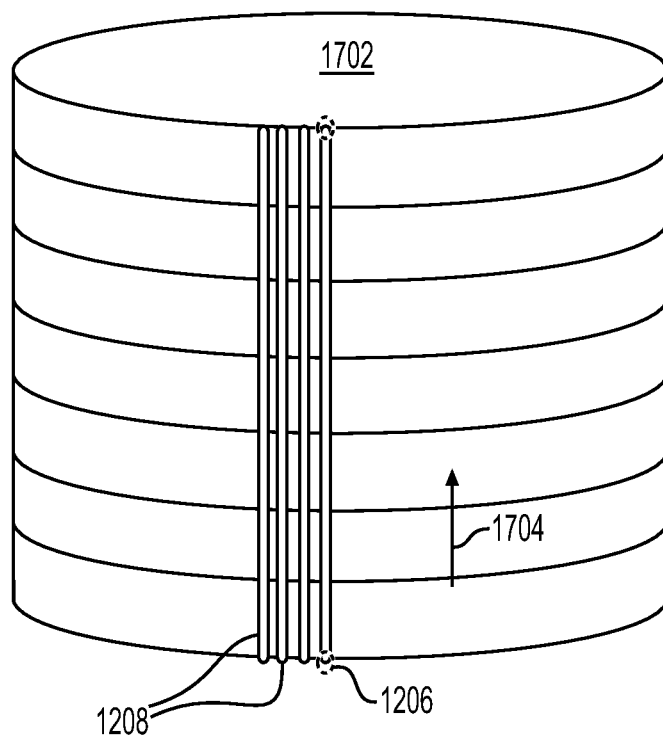
Figure 22:
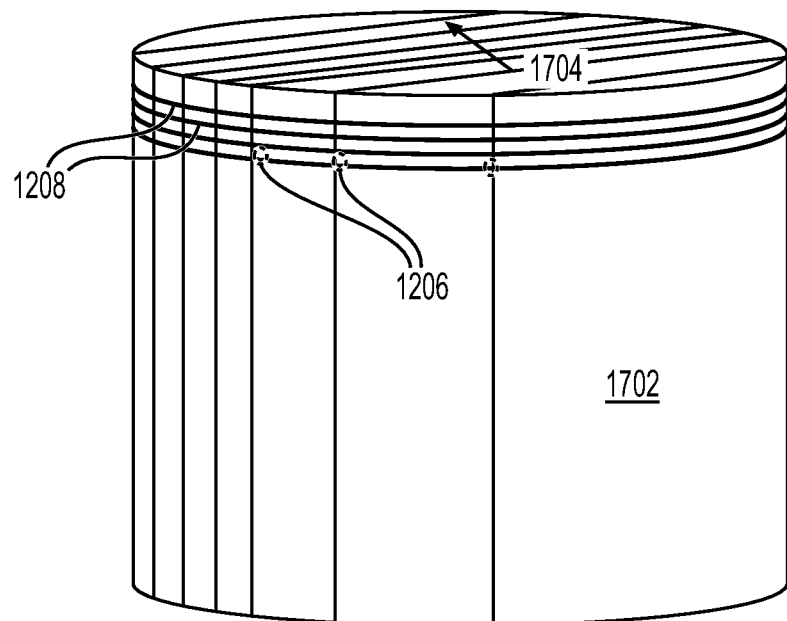
Figure 23:
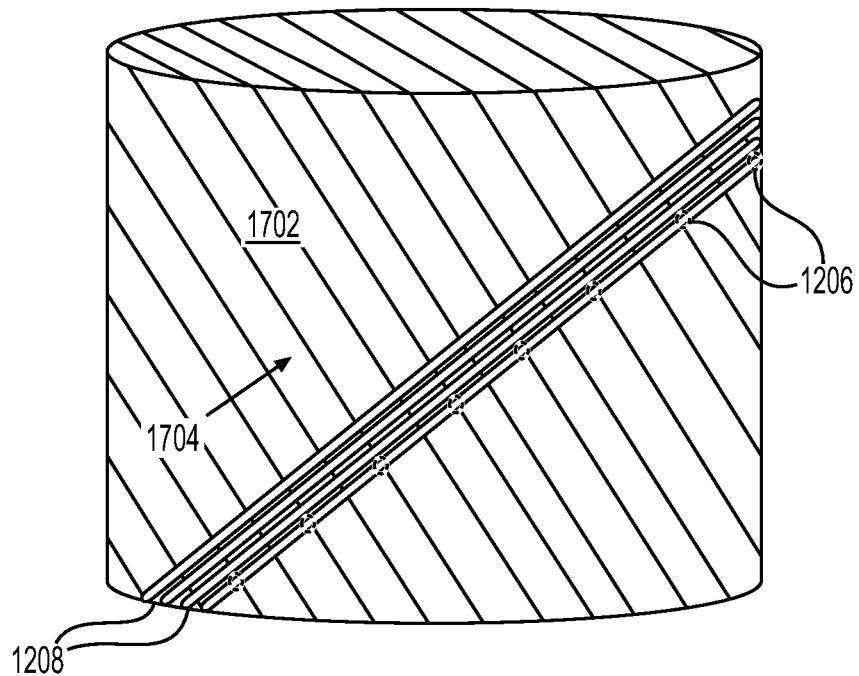

In one embodiment depicted in FIGS. 21, 22, and 23, path generation at the surface of structure 12 may be a function of how the internal skeleton of structure 12 was previously fabricated. In this embodiment, one or more paths 128 may be generated based on the propagation direction 1704 of datums through the skeleton of virtual model 1702. For example, paths 1208 may be generated to pass through points 1206 in a direction that is generally aligned with the propagation direction 1704. This may help increase a resistance to delamination between layers. Points 1206, in this example, may be distributed uniformly across an outer surface of structure 12 or distributed based on curvature of the virtual model and a desired resolution of structure 12.

Figure 6:
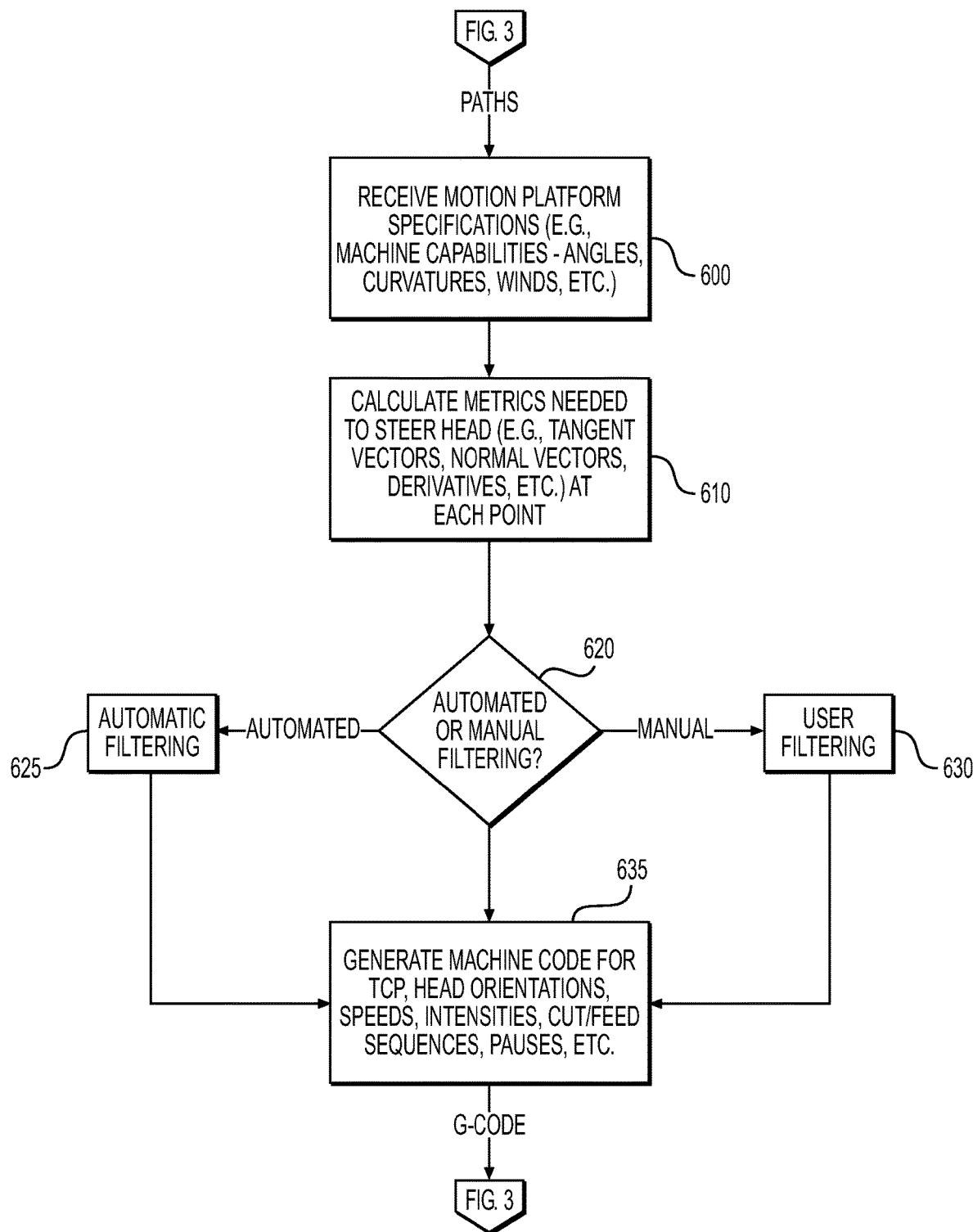

An exemplary CAM Module is illustrated in detail in FIG. 6. As seen in FIG. 6, processor 36 may receive information specific to the particular motion platform (e.g., support 18) that will be used to move head 20 during fabrication of structure 12 (Step 600). This information may include, for example, capabilities of support 18 with regard to reach distance, reach angle, motion resolution, maximum number of revolutions (e.g., winds) in a particular direction, speeds, accelerations, etc. In some embodiments, this information may also be associated with a particular configuration of head 20 that is attached to support 18. For example, a first head 20 and/or outlet 24 may have a different form factor, mass and/or capacity (e.g., cure speed) than another head 20 and/or outlet 24 of the same machine 14.

The information received at Step 600 may be received directly via manual input from the user, or automatically. For example, processor 36 may be configured to automatically poll and receive electronic communication from support 18 and/or head 20 regarding their capacities and/or configurations. Alternatively or additionally, processor 36 may be configured to automatically test for a capacity and/or configuration (e.g., by attempting to move support 18 and/or head 20 in a particular manner during a calibration procedure) and receiving feedback (e.g., sensory input) during the testing.

After receiving the information specific to machine 14, processor 36 may be configured to calculate metrics needed to steer head 20 along paths 1208 during material discharge through outlet 24 (Step 610). These metrics may include, for example, tangent vectors, normal vectors, and/or derivatives of the tangent and/or normal vectors at and/or between each point within each path.

Figure 24:
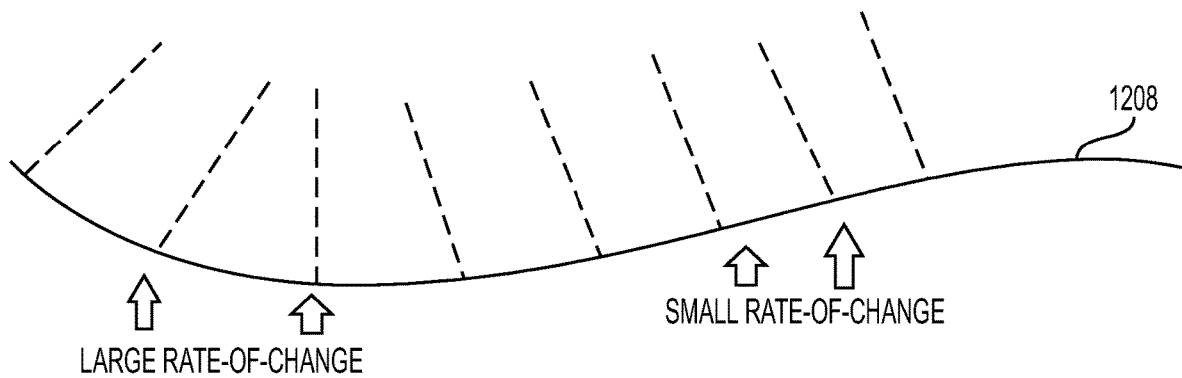

In some applications, it may be possible for paths to be generated that cannot be followed properly by the specific configuration of machine 14 intended to fabricate structure 12 or that are otherwise undesirable (e.g., noisy). Accordingly, some filtering of the paths and/or machine code may be implemented to account for these inconsistencies. It is contemplated that a user may be able to select manual or automatic filtering (Step 620), and for processor 36 to initiate corresponding filtering (Steps 625 or 630, respectively) based on the selection. The filtering may include for example, analyzing the derivatives of the tangent and/or normal vectors to look for and smooth out unexpected changes between adjacent points in the paths. These unexpected changes may be associated trajectory shifts (e.g., turns, dips, kinks, cross-overs, etc.) within the paths that cannot be properly followed by head 20 of the specific machine 14. For example, FIG. 24 illustrates a path 1208, for which normal vectors have been generated. By examining a rate of change of the normal vectors (e.g., by comparison with a threshold rate of change), an unacceptably sharp curve may be recognized (e.g., shown at the left of FIG. 24) and printability of the path 1208 analyzed. Any type of filtering strategy and/or algorithms known in the art may be used to look for and smooth out the unexpected changes or otherwise remove unwanted noise.

In one example of filtering, transitions between segments in a path may be selectively smoothed or rounded to eliminate vertices having angular changes greater than a threshold amount. For instance, a point-to-point curvature of a path may be calculated and, when the calculated curvature is greater than a user-provided or system-limited threshold, local smoothing may be implemented. Smoothing may include, among other things, adding additional and/or removing intermediate points at strategic locations to reduce the point-to-point curvature. This process may be implemented repeatedly any number of times until all calculated curvatures are less than the threshold amount.

In another example of filtering, printability of a path may be checked against material limitations instead of or in addition to machine limitations. That is, it may be possible for machine 14 to follow a prescribed path during material discharge, but the material intended for discharge along the path may experience unacceptable loading (e.g., tight curves that cause damage, such as breakage or fraying) during the discharge. In this example, curvatures may again be calculated as described above, compared to limitations of the materials (e.g., stresses, strains, etc.), and smoothed as necessary. Local physical analysis of the paths as bent beams of reinforcements having particular properties may be used to determine if the curvatures are acceptable. It is contemplated that, in addition to or instead of smoothing of the paths, other fabrication parameters (e.g., temperature, discharge speed, cure intensity, compaction force, etc.) could be selected to accommodate paths that might otherwise be unacceptable. It should be noted that similar checks may be made in relation to a particular matrix or matrix/fiber combination After filtering of the paths, machine code may be generated that causes a tool center point (TCP) of head 20 (e.g., a tip of outlet 24, a nip point of the compactor, etc.) to follow along the tangent vectors through each point in the paths at particular travel speeds, that causes a center axis of head 20 to be generally aligned with the normal vectors at each point, that inserts cut/feed sequences at the end and start of each path, that causes cure enhancers 22 and/or the compactor to be activated at specified intensity levels, etc. (Step 635). In one embodiment, the machine code may include a string of ASCII characters having a format similar to the example (EX-1) provided below:

EX-1
COMMAND; and
VALUE,
  wherein:
    COMMAND can be any preprogrammed function found within a corresponding library of memory 42; and
    VALUE can be a coordinate; On/Off; a percent from 0 to 100%, a number, etc.

Any number of commands may be included within a single string, and an order of the commands may be important to successful completion of the path. The values may be pulled from a lookup table stored within memory 42 based on the points within the filtered paths, the tangent vectors, the normal vectors, the derivatives, the material being discharged, and/or other command values (e.g., values associated with other commands being issued at the same time) within the same string of ASCII characters.

For example, for travel of head 20 between points that lie adjacent to each other on a longer straighter path, code may be generated that causes head 20 to travel between the points at a higher relative speed. Likewise, for travel at the higher relative speed, code may be generated that causes cure enhancers 22 to be activated at a higher intensity level, such that a discrete unit of discharged material is exposed to a desired quantity of energy. In contrast, for travel of head 20 between points that lie on a shorter and/or curvier path, code may be generated that causes head 20 to travel between the points at a lower relative speed and/or at a lower cure intensity level. Opaque materials may generally require slower travel speeds and/or higher cure intensity levels than more transparent materials. Lower compaction forces may be implemented on paths within a narrower cross-section of structure 12 and/or on paths that are unsupported.

At an end of a particular path, code may be generated that causes the TCP of head 20 to move away from and/or towards the corresponding point at a fly-away and/or fly-in angle α that is oblique to the tangent and the normal of the path through the point. Code may similarly be generated just before the end of the path to cause a cutter to sever the reinforcement at a particular distance of the TCP before the final point, and then for head 20 to transition to a new fly-in location at a start of a next path. Code for adjustments in compaction force may be generated during a start and/or end of a path, during formation of different features of a path (e.g., level vs inclined, straight vs curved, etc.) and/or when transitioning between paths that overlap an underlying layer and paths that are in free-space (i.e., unsupported). In some embodiments, a location of the TCP may be shifted, for example depending on a location of head 20 along a particular path (e.g., at a start, middle, or end).

Figure 25:
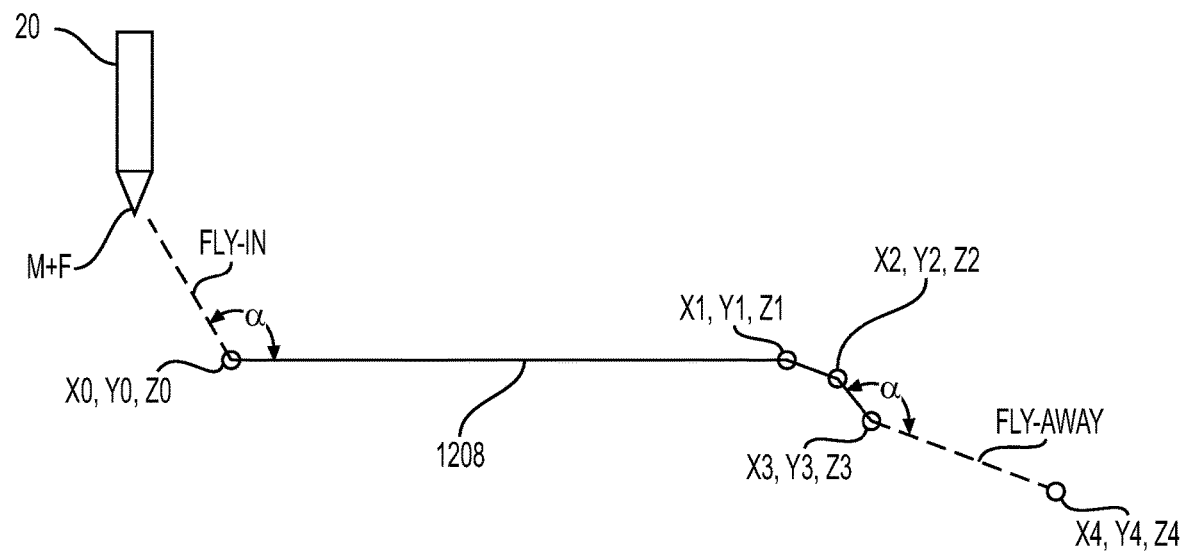

An example string of ASCII characters that causes head 20 to discharge material along the path depicted in FIG. 25 is provided in the table below (T-1):

T-1

| $Path_{0-4}$ | | | | | | |
|---|---|---|---|---|---|---|
| Command | Fly-In | Command | Move | Command | Delay | Command |
| Value | X0, Y0, Z0 | Value | X1, Y1, Z1 | Value | 2 Seconds | Value |
| Command | Speed | Command | Speed | Command | Cure Intensity | Command |
| Value | 10% | Value | 100% | Value | 100% | Value |
| Command | Cure Intensity | Command | Cure Intensity | Command | Compaction | Command |
| Value | 0% | Value | 100% | Value | 100% | Value |
| Command | Compaction | Command | Compaction | | | |
| Value | 0% | Value | 100% | | | |
| Move | Command | Move | Command | Fly-Away | Command | Cut |
| X2, Y2, Z2 | Value | X3, Y3, Z3 | Value | X4, Y4, Z4 | Value | Wait for done |
| Speed | Command | Speed | Command | Speed | Command | Cure intensity |
| 20% Cure Intensity | Value | 20% Cure Intensity | Value | 20% Cure Intensity | Value | 0% Compaction |
| 50% Compaction | Command | 50% Compaction | Command | 0% Compaction | Command | 0% |
| 75% | Value | 75% | Value | 0% | Value | |

After completion of Step 635, control may return to FIG. 3. Specifically, the machine code may be used to simulate fabrication of structure 12 according to Step 330 discussed above.

Figure 7:
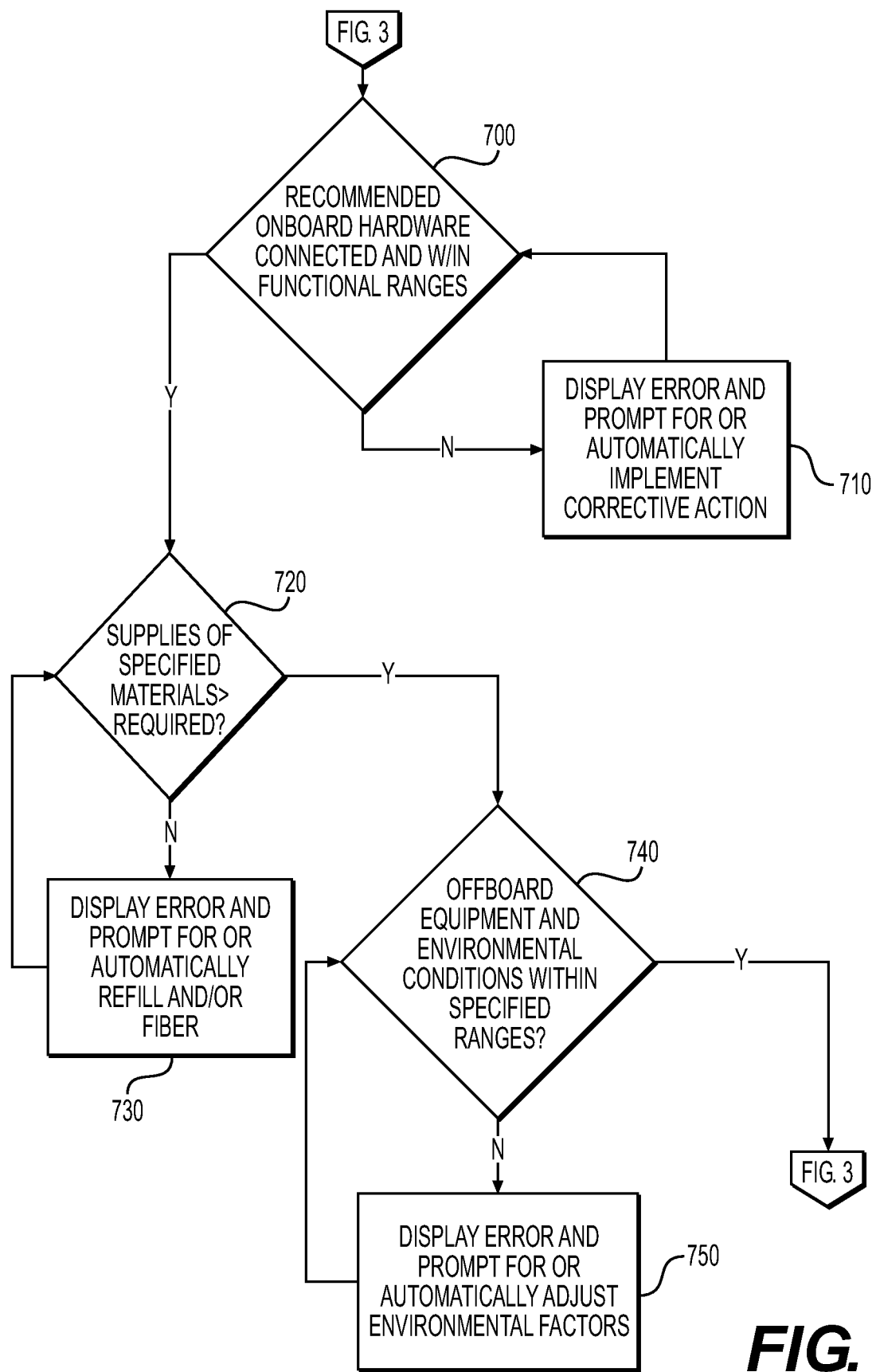

An exemplary Check Module is illustrated in detail in FIG. 7. The Check Module may help processor 36 ensure that machine 14 is ready to execute the selected plan of fabrication paths and manufacture structure 12. This procedure may include a number of different steps, which may be implemented in any desired order.

One of these steps may include determining if hardware recommended for use in fabricating structure 12 is currently connected to machine 14 and operational within specified ranges (Step 700). This hardware may include, among other things, high-level print head modules and lower-level component hardware, such as compacting hardware, matrix wetting hardware, cut hardware, feed hardware, cure hardware, and/or other output peripherals 40B (referring to FIG. 2). For example, processor 36 may be configured to receive input from any number of proximity sensors, RFID tags, or other input peripherals 40A indicative of whether each and/or which of the output peripherals 40B are connected to machine 14. In another example, operational sensors (e.g., temperature sensors, pressure sensors, intensity sensors, etc.) and/or other input peripherals 40A may provide input to processor 36 indicative of an operational condition (on/off, within expected range, etc.) of the output peripherals 40B. Depending on the signals received by processor 36, processor 36 may selectively generate an error (e.g., in response to a missing hardware component) and/or selectively cause a warning (e.g., in response to an inappropriate operational range) to be shown on display 34 or otherwise brought to the attention of the user (e.g., via a light on machine 14). In some instances, the error(s) may inhibit operation of machine, while the warning(s) may simply prompt a user to implement a corrective action (Step 710). In other instances, processor 36 may automatically implement a corrective action (e.g., adjust a temperature, pressure, intensity, etc.) in response to the warning.

Another step in the procedure performed by the Check Module may include determining if a sufficient supply of matrix, reinforcement, and/or additive(s) are available to head 20 (Step 720). In one embodiment, this determination may be made, for example, based at least in part on input from the user that is indicative of an amount of material in, on or otherwise being passed to head 20. Specifically, processor 36 may compare this amount with a required amount to determine if some amount more than required to make structure 12 is currently available.

It is contemplated that processor 36 may additionally or alternatively track supply and usage of the material (e.g., via one or more input peripherals 40A, such as an ultrasonic or laser sensor that measures matrix level, additive level, spool diameter, weights, etc.), and compare an amount consumed with an amount supplied to determine if some amount more than required to make structure 12 is currently available. When less material is currently available, processor 36 may generate an error and/or provide a warning to the user (e.g., via display 34), thereby prompting the user to refill the corresponding supplies of materials or override the warning (Step 730). Processor 36 may alternatively implement an automated replenishment process, if desired. When processor 36 determines that sufficient material is available, Step 720 may be bypassed.

Another step in the procedure performed by the Check Module may include determining if offboard equipment (e.g., safety equipment) and/or environmental factors are within required ranges (Step 740). The offboard equipment may include, for example, interlocks associated with safety enclosures around machine 14, room scanners around machine 14, and/or emergency stop buttons near machine 14. When any of these and/or other safety equipment generate signals indicative of unsafe conditions, processor 36 may inhibit operation of machine 14 and/or provide a warning to the user (e.g., via display 34), thereby prompting the user to clear the area, close safety enclosures, and/or ensure proper operation of the safety equipment (Step 750). Similarly, processor 36 may automatically take measurements of environmental conditions (e.g., temperature, humidity, light, etc. —via input peripherals 40A) around machine 14 and compare the measurements to required conditions stored within the library of memory 42. When any of the measured conditions are out of range of expected values, processor 36 may automatically adjust the conditions (e.g., via output peripherals 40B), inhibit operation of machine 14, and/or provide a warning to the user (e.g., via display 34), thereby prompting the user to manually adjust the conditions and/or override the warning. Control may then return to FIG. 3.

Figure 8:
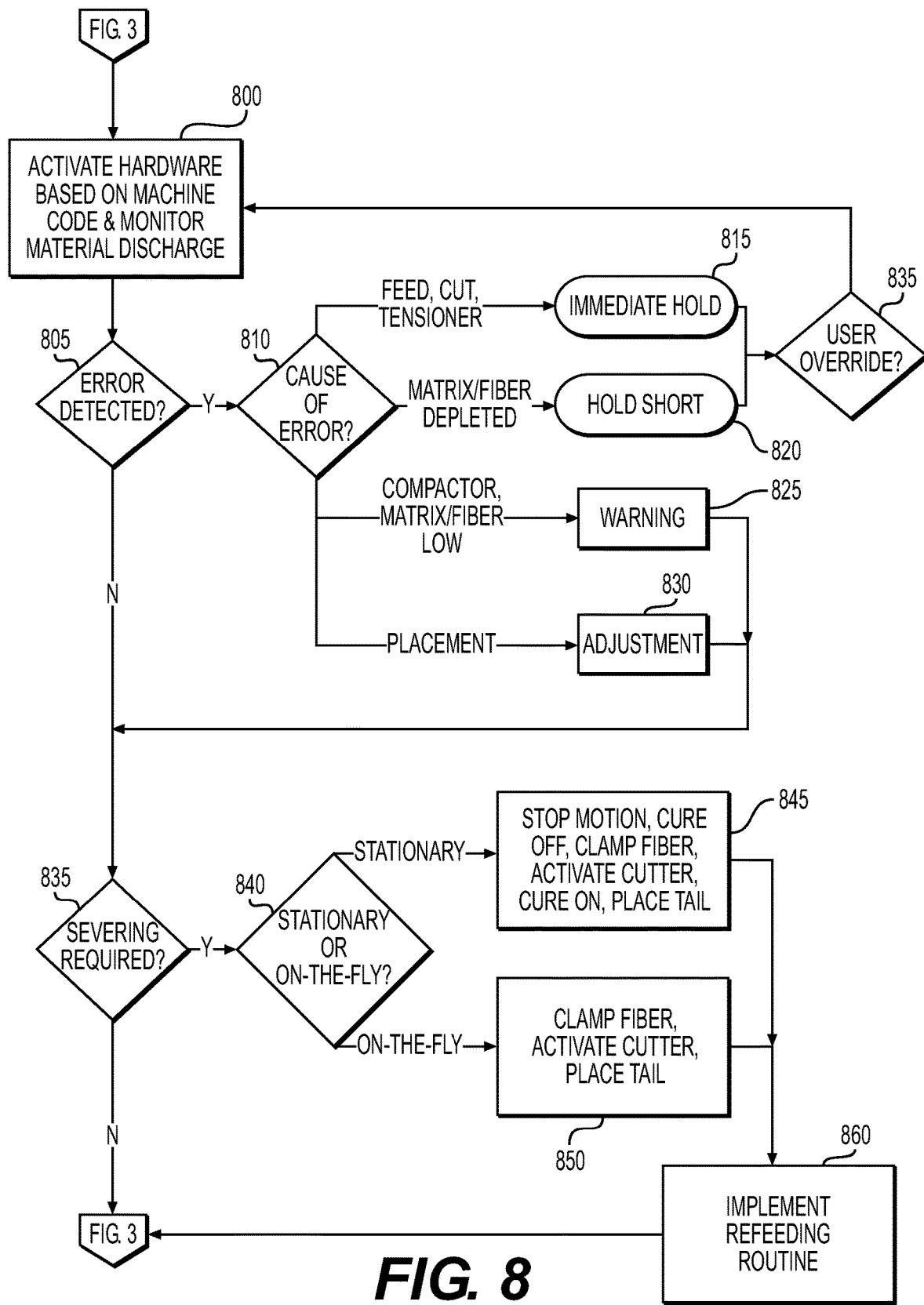

An exemplary Discharge Module is illustrated in FIG. 8. As shown in FIG. 8, processor 36 may activate hardware (e.g., output peripherals 40B and/or support 18) of machine 14 based on the machine code received from the CAM module and thereby cause material to be discharged along paths 1208 in a corresponding manner. This may include, for example, causing the material to be discharged (pulled and/or pushed) from a nozzle 30 of outlet 24 (referring to FIG. 1), activating output devices of peripherals 40B associated with support 18 to move the TCP of head 20 along a trajectory of the path at a specified speed, and regulating head 20 (e.g., one or more output devices of peripherals 40B attached to head 20) to release the associated fibers with a specified tension. In addition, processor 36 may selectively activate the output devices of peripherals 40B to compact the discharging material and to irradiate the discharging material according to parameters specified for a given point and/or segment along a given path. At the same time, processor 36 may monitor the resulting discharge (Step 800).

For example, during completion of the first commands in the string shown in table T-1 above, processor 36 may monitor movement of head 20 from (X0, Y0, Z0) to (X1, Y1, Z1) and determine if material is being paid out and cured as expected (Step 805). This monitoring may include, for example, tracking a length of reinforcement passing through head 20 (e.g., via a rotary encoder or potentiometer connected to a fiber spool, a feed roller, a fiber redirect, etc. within head 20) and comparing that amount with a theoretical distance between (X0, Y0, Z0) and (X1, Y1, Z1) and/or with an actual distance that head 20 is moved by support 18 in response to the commands. When the distance is not about equal (e.g., with engineering tolerances) to the length of reinforcement, processor 36 may determine that an error has occurred. The error could indicate that the fiber has broken, that the fiber supply was exhausted, that the matrix did not cure properly at point (X0, Y0, Z0), that the fiber was dislodged from point (X0, Y0, Z0), and/or that another error has occurred.

In some instances, input regarding fiber tension and/or motion of an associated tensioner may also be considered when determining proper material payout. For example, it may be possible for the fiber to become stuck at some location inside head 20 and for slack or excessive tension to be accommodated for by overtravel of the tensioner. In one situation, a sudden spike in tensioner motion in a tension-decreasing direction could indicate improper payout of material, even though the rotary sensor might suggest otherwise. In another situation, if the fiber were to break, overtravel of the tensioner in an opposite and tension-increasing direction (i.e., a direction of the tensioner that would normally attempt to increase tension of the fiber) may be detected and again indicate improper payout of material.

In some instances, an amount of consumed matrix may be monitored (e.g., via a level sensor or other input peripheral 40A) and compared with an amount that theoretically should be consumed during discharge from (X0, Y0, Z0) to (X1, Y1, Z1). When the two amounts to do not substantially match (e.g., within engineering tolerances), processor 36 may again conclude that material has been paid out improperly.

Finally, it may be possible for the discharging material to be placed in error. For example, the material may be placed too far away from a previously placed path of material, allowing gaps to exist between the paths. Alternatively, the material could be placed to overlap the previously placed path of material, causing undesired buildup. In either situation, based on any combination of input from peripherals 40A (e.g., image signals, location signals, etc.) processor 36 may again conclude that material has not been paid out properly.

When any of these and other errors are detected by processor 36 (Step 805), processor 36 may implement any number of different responses. These responses can include, among other things, implementing an immediate hold response, a hold-short response, a warning response, and/or an adjustment to operation of head 20. The immediate hold response may include immediately halting motion of support 18 and further material discharge activities of head 20. The hold-short response may include allowing support 18 and head 20 to complete only a current path (i.e., hold short of a next path) or segment of path (i.e., hold short of a next segment of the same path) and then to move to a known safe location away from structure 12 and await manual instruction from the user. The warning response may include a visual, audible, and/or tactile indication provided to the user (e.g., via display 34) that alerts the user to an unexpected condition, allowing the user to determine if the current process should be interrupted or overridden to allow continuance. The adjustments may include adjustments to any operation of head 20 (of output peripherals 40B) and/or of the paths yet to be followed by machine 14.

When an error has been detected during material discharge, processor 36 may attempt to determine a cause of the error (Step 810) and selectively implement one of the four above-described responses (and/or other responses) based on the cause (Steps 815, 820, 825, and/or 830, respectively).

For example, during and/or just after completion of a feed event, which will be described in greater detail below, processor 36 may monitor material discharge from head 20 to confirm that reinforcement (e.g., any amount greater than zero) is being paid out during motion of head 20 relative to structure 12. When signals from an associated sensor and/or other input peripheral 40A are not indicative of reinforcement being paid out at this time, processor 36 may conclude at Step 810 that the feed event failed and/or that the reinforcement has become dislodged from anchor 32, and control may pass to Step 815. Similar action may be taken when the signals from the sensor indicate motion of the reinforcement in a reverse direction through head 20 following the feed event.

In another example, during and/or just after completion of a cut event, which will be described in greater detail below, processor 36 may monitor material discharge from head 20 to confirm that reinforcement (e.g., any amount greater than zero) is not being paid out during motion of head 20 relative to structure 12. When signals from the associated sensor or other input peripheral 40A are indicative of reinforcement being paid out at this time, processor 36 may conclude at Step 810 that the cut event has failed and control may again pass to Step 815.

In another example, during normal discharge that is not associated with a cut event, a feed event, or any other special event, processor 36 may monitor material discharge from head 20 to confirm that reinforcement is being paid in an amount corresponding to the motion of head 20. When signals from the associated sensor or other input peripheral 40A are indicative of an incorrect amount of reinforcement being paid out at this time, processor 36 may conclude at Step 810 that material is not being discharged in a desired manner and control may again pass to Step 815.

In another example, during any event (e.g., feed, cut, normal, and/or otherwise), processor 36 may monitor tensioner operation to confirm that that the tensioner is functioning within an expected operational range (e.g., not over-traveling in any direction). When signals from an associated input peripheral 40A are indicative of overtravel, processor 36 may conclude at Step 810 that material is not being discharged in a desired manner and control may again pass to Step 815. It is contemplated that overtravel of the tensioner in one or both directions (e.g., in the tension-increasing direction) could alternatively result in control passing to Step 820 or Step 825, if desired.

In a similar example, during normal operation, processor 36 may monitor compactor operation to confirm that that the compactor is remaining within an expected operational range (e.g., not bottoming out and providing at least some compaction at all specified times). When signals from an associated input peripheral 40A are indicative of improper compactor operation, processor 36 may conclude at Step 810 that material is not being discharged in a desired manner and control may again pass to Step 815. It is contemplated that during a no-compaction situation, control could alternatively pass to Step 820 or 825, if desired.

In another example, during any operation of head 20, processor 36 may monitor material supply levels (e.g., of reinforcement, matrix, and/or additive supplies) to confirm that sufficient material remains to complete at least a current path or all of structure 12. When signals from associated input peripheral(s) 40A are indicative of a depleted material (e.g., enough material to complete a current path, but not a next path), processor 36 may conclude at Step 810 that a material error exists and control may pass to Step 820. However, when the signals are indicative of only low levels of material (e.g., enough material to complete multiple paths, but perhaps not enough to complete all of the paths), control may instead pass to Step 825. It is contemplated that during low levels of fiber, control could alternatively pass to Step 820, if desired.

After implementation of either of Steps 815 or 820, operation of machine 14 may be halted until input from a user provides an override to continue operation. Accordingly, processor 36 may monitor I/O devices 38 (referring to FIG. 1) and return control to Step 800 only upon receiving corresponding input from the user (Step 830).

After generating the warning at Step 825, normal operation of machine 14 may continue. That is, machine 14 may be caused to continue discharging material along the paths, as specified in the machine code.

When processor 36 determines at Step 810 that reinforcement has been placed onto or into structure 12 in error (e.g., via images capture of structure 12 by an input peripheral 40A, such as scanner), any number of different adjustments may be implemented (Step 830). For example, when an unacceptable wide gap has been created between adjacent tows of fibers of structure 12, adjustments may be implemented to cause future paths to be shifted in a particular direction and/or closer together. Similarly, when overlapping of adjacent tows is detected, adjustments may be to cause future paths to be shifted in a particular direction and/or further apart. Additionally, when cutting and/or feeding material, the cutting and/or feeding locations may not match intended cutting and/or feeding locations. Available adjustments may include, for example, a shift in the TCP location, an increase or decrease in tension, an increase or decrease in cure intensity, an increase or decrease in head travel speed along the paths, timings of special (e.g., cutting, feeding, etc.) events, and/or gains applied to the coordinates of the paths.

In one specific embodiment, when errors in material placement are detected (e.g., each time or only after a threshold amount of error as been detected), processor 36 may determine a need to reanalyze the virtual model of structure 12. That is, placement errors, if significant enough, could negatively affect a performance of structure 12. In these situations, processor 36 may be configured to update the virtual model (e.g., the CAD file) with the actual placement of fibers up to the current point in fabrication, and direct the virtual model back through the corresponding infill and/or surface modules (310 and/or 315—referring to FIG. 3) for a new analysis (e.g., FEA, BEM, Topology Optimization, etc.) of the anticipated performance of structure 12. This may result in performance-driven adjustments to the paths yet to be executed by machine 14. In other words, processor 36 may halt operation of machine 14 partway through fabrication of structure 12, update the CAD file of structure 12, reanalyze the associated model, and make adjustments to the remaining paths in order to accommodate actual placement of the initial paths already completed.

In one specific example, during discharge monitoring, processor 36 may detect that a cut and subsequent feed location has been consistently erroneous, resulting in every path of fiber being shorter than specified at a particular location on or within structure 12. If not otherwise accounted for, this could result in weakness at that location. Accordingly, after directing the updated virtual model back through Steps 310 and/or 315 to 360, the subsequently generated paths may call for longer fibers to make up for the initial lack of material at the weakened location.

In another specific example, in response to processor 36 detecting overlaps or gaps between adjacent paths of material (e.g., via a profilometer or other peripheral 40), recycling back through Steps 310 and/or 315 to 360 may produce a change in ply angle of one or more of the remaining paths. The change in ply angle(s) may produce an average or overall ply angle for the particular section of structure 12 that approximates the originally intended orientation.

During normal operation (e.g., when no errors have been received at Step 805), a command to cut the fibers near the end of a particular path may be received (e.g., before head reaches (X4, Y4, Z4) in the example of table T-1). Processor 36 may determine if this command has been received (Step 835) and selectively implement a corresponding routine. It is contemplated that multiple different cutting routines could be implemented at this time, including a stationary cutting routine and an on-the-fly cutting routine. Processor 36 may determine if the to-be-implemented routine should be the stationary routine or the on-the-fly routine depending on a hardware makeup of machine 14 and/or based on the current and/or next path being followed (Step 840).

During implementation of the stationary cutting routine (Step 845), processor 36 may cause all motion of head 20 to stop (e.g., by directing corresponding commands to support 18). This may effectively cause the pulling of material from head 20 to cease during normal operations. At about this same time, processor 36 may deactivate the cure source, active a fiber clamp inside of head 20, and activate the cutting mechanism. Thereafter, the cure source may be reactivated (e.g., to anchor a severed tail extending from head 20), followed by deactivation of the clamp. Motion of head 20 may then be restarted. It should be noted that deactivation of the claim prior to anchoring could cause the reinforcement to be undesirably retracted back into head 20, which could then require rethreading.

During implementation of the on-the-fly cutting routine (Step 850), motion of head 20 may not need to cease and the cure mechanism may not be deactivated. Instead, processor 36 may synchronize activation of the clamp and the refeeding of the fiber (i.e., extension of the severed tail) with the TCP of head 20 reaching a particular coordinate along a current path. The fiber may be clamped just before severing of the fiber, and then quickly released after anchoring of the tail. Processor 36 then may cause support 18 to move head 20 through the remaining portion of the current path without interruption.

Once severing of the material discharging from head 20 has been accomplished, a refeeding routine may be implemented (Step 860). Any refeeding routine known in the art may be utilized. Control may then return to Step 365 of FIG. 3.

It will be apparent to those skilled in the art that various modifications and variations can be made to the disclosed systems and methods. Other embodiments will be apparent to those skilled in the art from consideration of the specification and practice of the disclosed systems and methods. It is intended that the specification and examples be considered as exemplary only, with a true scope being indicated by the following claims and their equivalents.

What is claimed is:

1. A method for additively manufacturing a structure, comprising:
   receiving or generating a 3D virtual model of the structure;
   receiving a material property for the 3D virtual model;
   generating a mesh of interconnected geometrical shapes within boundaries of the 3D virtual model;
   generating a vector field through the 3D virtual model from the mesh and a boundary condition;
   slicing the 3D virtual model into a plurality of layers that are aligned based on the vector field;
   generating at least one tool path for at least one of the plurality of layers; and
   causing an additive manufacturing machine to move a head and deposit a material along the at least one tool path and within the at least one of the plurality of layers to form the structure, wherein the material is a composite material including a continuous reinforcement and a matrix.

2. The method of claim 1, further including applying at least one infill pattern to the at least one of the plurality of layers, wherein generating the at least one tool path includes generating the at least one tool path to pass through sequential points of the at least one infill pattern.

3. The method of claim 1, wherein the generating a vector field through the 3D virtual model is performed through Finite Element Analysis.

4. The method of claim 1, wherein the material property includes an isotropic property and the boundary condition includes an intended loading of the structure, and wherein generating the vector field includes generating the vector field based on the isotropic property and the intended loading.

5. The method of claim 4, further including applying at least one infill pattern to at least one of the plurality of layers, wherein generating the at least one tool path includes generating the at least one tool path to pass through sequential points of the at least one infill pattern.

6. The method of claim 4, wherein the isotropic property is selected from one or more of stress, strain, strength, stiffness, deflection, hardness, ductility, magnetism, electrical conductivity, and/or reflectivity.

7. The method of claim 5, further including:
performing an analysis on at least one of the plurality of layers based on an anisotropic property of the material and the at least one infill pattern; and
responsively adjusting a topology of the at least one infill pattern based on the analysis, wherein causing the additive manufacturing machine to deposit the material along the at least one tool path includes causing the additive manufacturing machine to deposit the material along the at least one tool path after the adjusting.

8. The method of claim 7, wherein the generating a vector field through the 3D virtual model is performed through Finite Element Analysis.

9. The method of claim 7, wherein:
the anisotropic property is a structural property;
the method further includes performing an additional analysis on the at least one of the plurality of layers after adjustment based on a non-structural property and responsively making an additional adjustment based on the additional analysis; and
causing the additive manufacturing machine to deposit the material along the at least one tool path includes causing the additive manufacturing machine to deposit the material along the at least one tool path after the additional adjustment.

10. The method of claim 4, wherein:
the material property is a structural property; and
the method further includes:
performing an analysis on the at least one of the plurality of layers based on a non-structural property of the material and the at least one infill pattern; and
responsively adjusting a topology of the at least one infill pattern based on the analysis, wherein causing the additive manufacturing machine to deposit the material along the at least one tool path includes causing the additive manufacturing machine to deposit the material along the at least one tool path after the adjusting.

11. The method of claim 1, wherein the at least one of the plurality of layers is curved and extends across three dimensions.

12. The method of claim 1, further including:
analyzing the mesh to generate the vector field.

13. The method of claim 1,
wherein the method further comprises:
applying at least one infill pattern to the at least one of the plurality of layers;
performing an analysis of the at least one of the plurality of layers based on the at least one infill pattern and an anisotropic property of the material;
adjusting the at least one infill pattern based on the analysis; and
wherein the generating of the at least one tool path includes generating the at least one tool path to pass through sequential points of the at least one infill pattern after the adjusting.

14. The method of claim 13, wherein the at least one tool path is aligned based on the vector field.

15. The method of claim 14, wherein the anisotropic property is a structural property.

16. The method of claim 15, wherein:
the method further includes performing an additional analysis on the at least one of the plurality of layers after adjustment based on a non-structural property of the material and responsively making an additional adjustment based on the additional analysis; and
causing the additive manufacturing machine to deposit the material along the at least one tool path includes causing the additive manufacturing machine to deposit the material along the at least one tool path after the additional adjustment.

17. The method of claim 1, wherein the plurality of layers that are aligned based on the vector field are aligned such that none of the plurality of layers are perpendicular to the vector field.

* * * * *